(12) United States Patent
Gonzales et al.

(10) Patent No.: US 12,277,458 B1
(45) Date of Patent: Apr. 15, 2025

(54) MESSAGING APPLICATION INFORMATION ORGANIZER

(71) Applicant: YGO DEVELOPERS LTD., Victoria (CA)

(72) Inventors: Brenda I. Gonzales, Quintana Roo (MX); Garry D. Robb, Quintana Roo (MX); James Paolo P. Garcia, Victoria (CA)

(73) Assignee: YGO DEVELOPERS LTD., Victoria (CA)

( * ) Notice: Subject to any disclaimer, the term of this patent is extended or adjusted under 35 U.S.C. 154(b) by 0 days.

(21) Appl. No.: 18/925,723

(22) Filed: Oct. 24, 2024

Related U.S. Application Data

(60) Provisional application No. 63/545,696, filed on Oct. 25, 2023.

(51) Int. Cl.
*G06F 9/54* (2006.01)

(52) U.S. Cl.
CPC .................................... *G06F 9/546* (2013.01)

(58) Field of Classification Search
None
See application file for complete search history.

(56) References Cited

U.S. PATENT DOCUMENTS

| | | | | |
|---|---|---|---|---|
| 2009/0282115 | A1* | 11/2009 | Hung | H04L 51/04 709/206 |
| 2011/0161436 | A1* | 6/2011 | Moore | G06F 9/542 709/206 |
| 2013/0159443 | A1* | 6/2013 | Dellenbach | H04L 51/043 709/206 |
| 2018/0067761 | A1* | 3/2018 | Cattermole | G06F 9/46 |
| 2019/0197537 | A1* | 6/2019 | Desai | G06Q 20/385 |
| 2020/0320518 | A1* | 10/2020 | Simas | H04L 9/3247 |
| 2023/0168784 | A1* | 6/2023 | Zhang | G06F 3/0481 715/781 |

* cited by examiner

*Primary Examiner* — Charles E Anya
(74) *Attorney, Agent, or Firm* — Panitch Schwarze Belisario & Nadel LLP

(57) ABSTRACT

A multi-entity organizing system designed to streamline and optimize data management is provided by a unified platform for labeling and organizing various entities. The system employs a hierarchical structure of "Pillars" and "Subpillars" to categorize and tag data objects, such as contacts, messages, files, notes, and more, into cohesive groups. By utilizing these labels, efficient data retrieval, seamless cross-referencing, and simplified organization, is provided for such items, ultimately offering a comprehensive solution to consolidate diverse data within a single application.

20 Claims, 25 Drawing Sheets

Figure 3

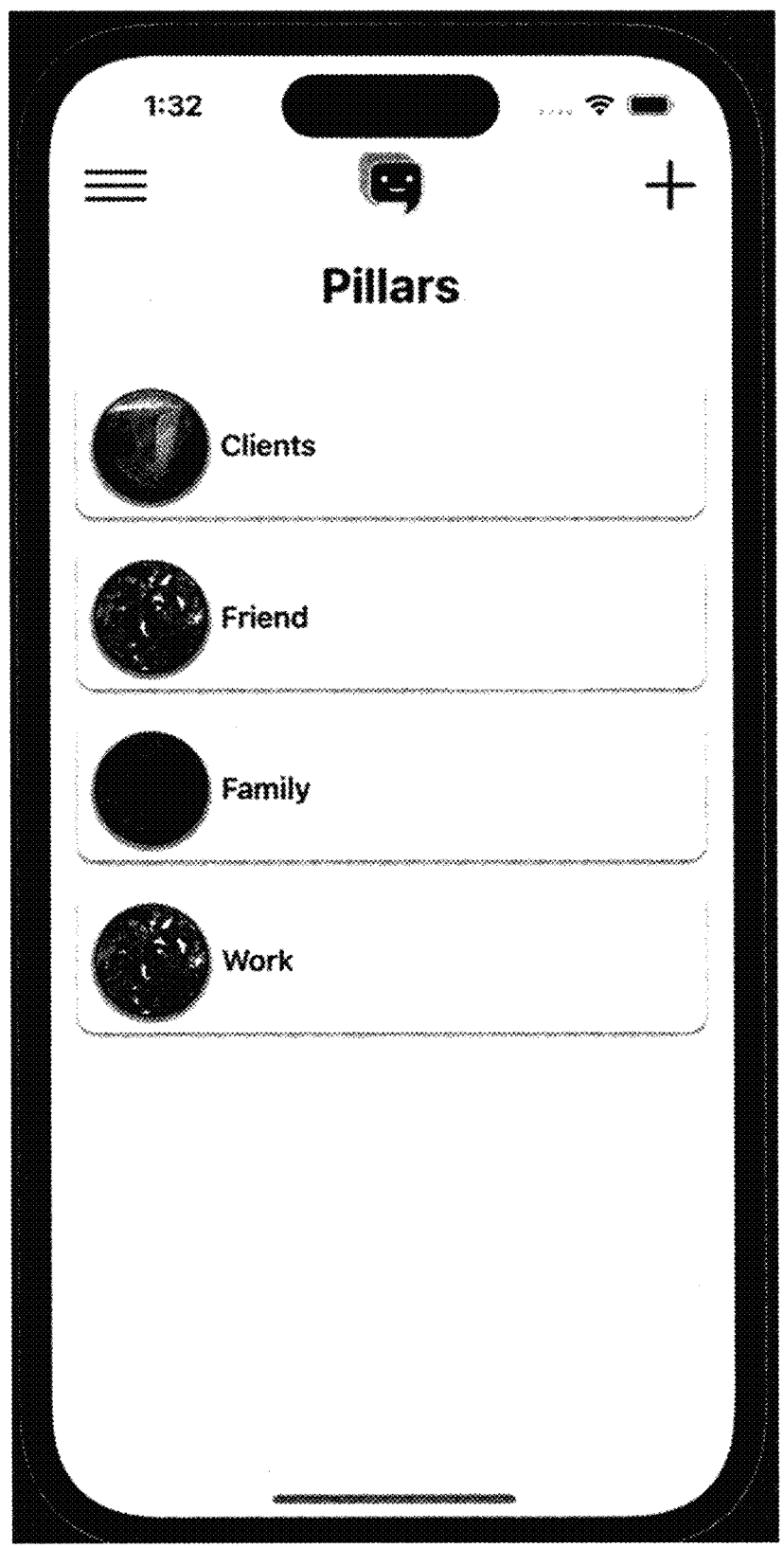
Figure 4B: Pillars View: The App's main view.

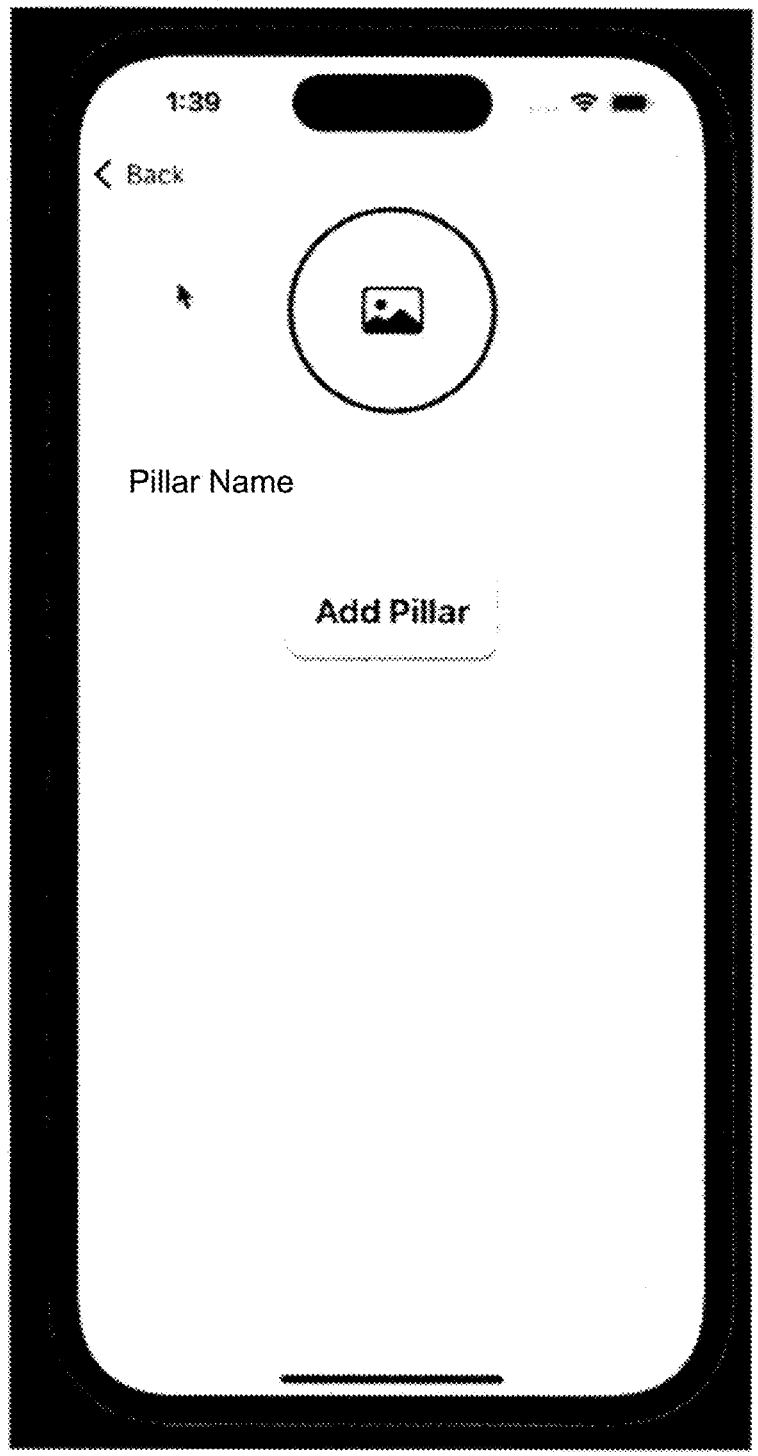
Figure 4C: Add Pillar

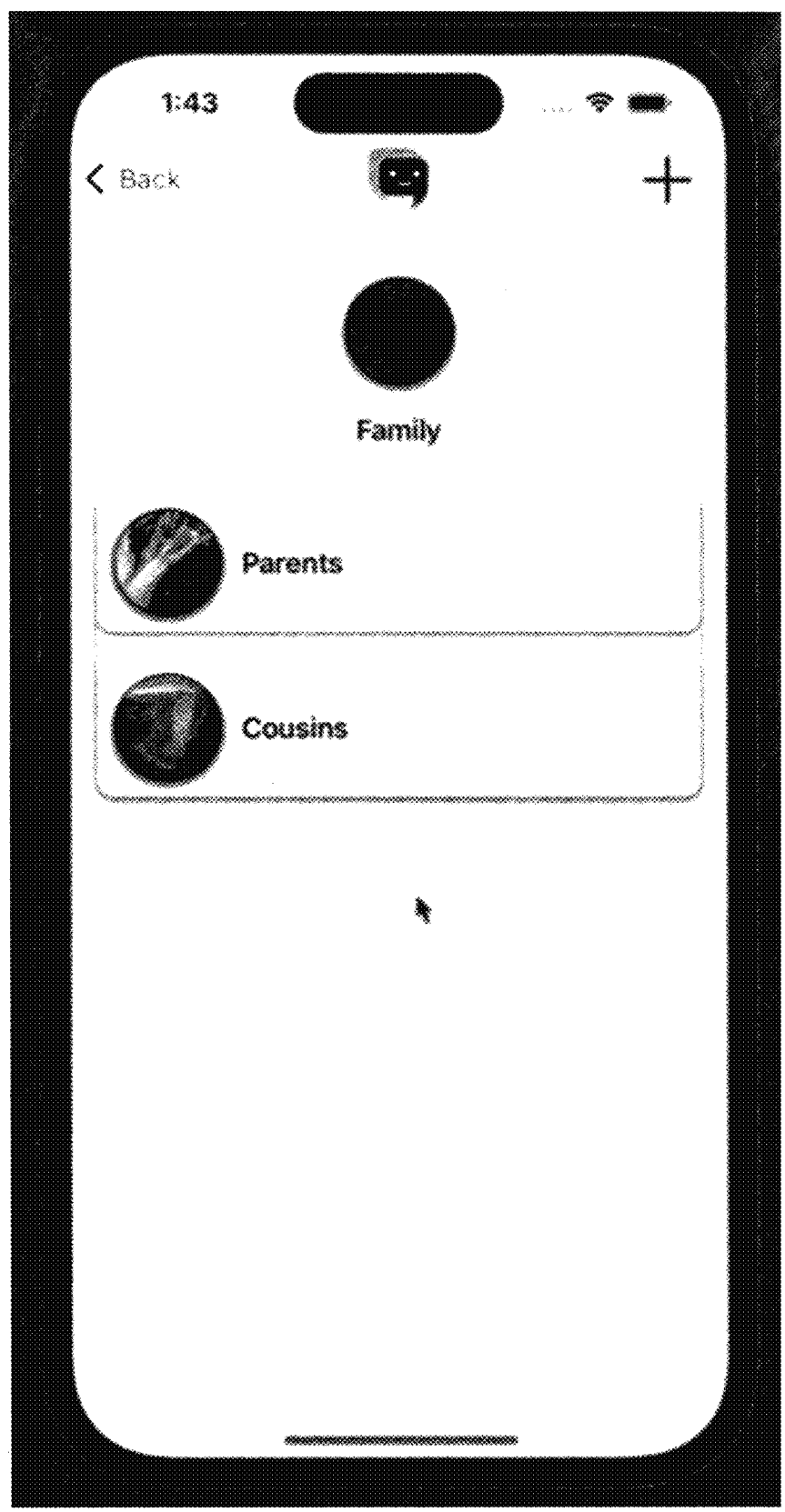
Figure 4D: Subpillar View

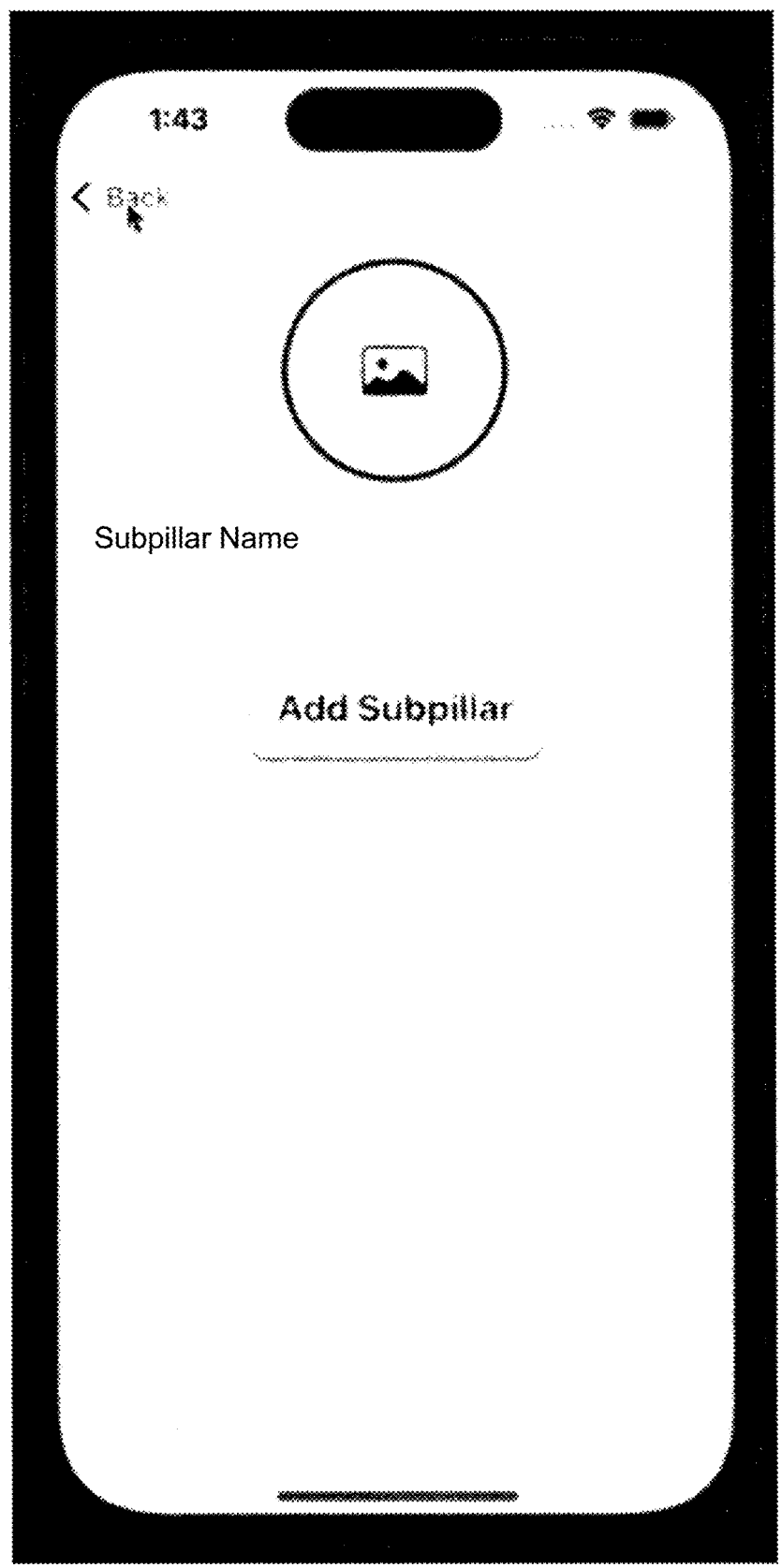
Figure 4E: Add Subpillar

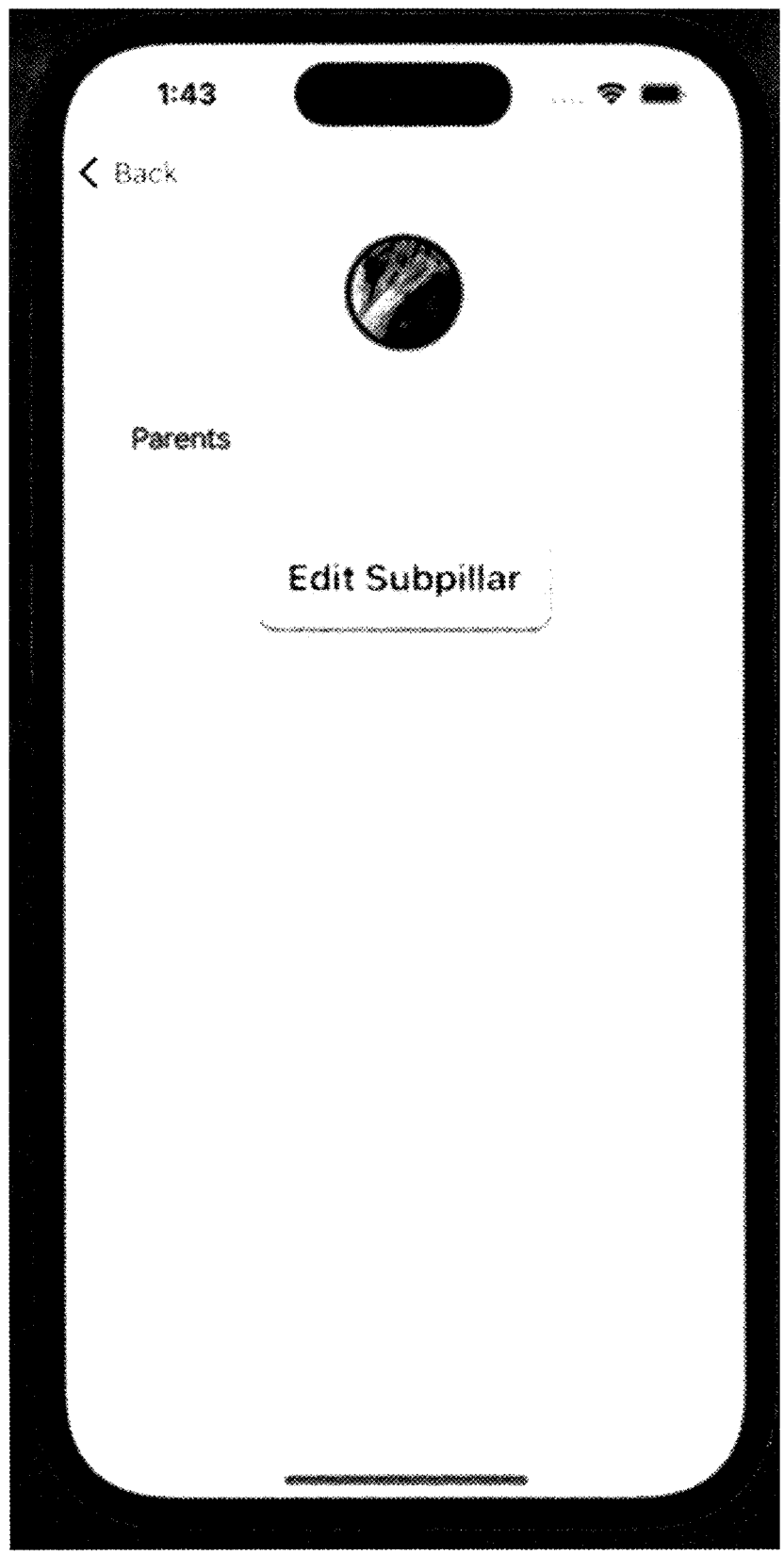
Figure 4F: Edit Subpillar

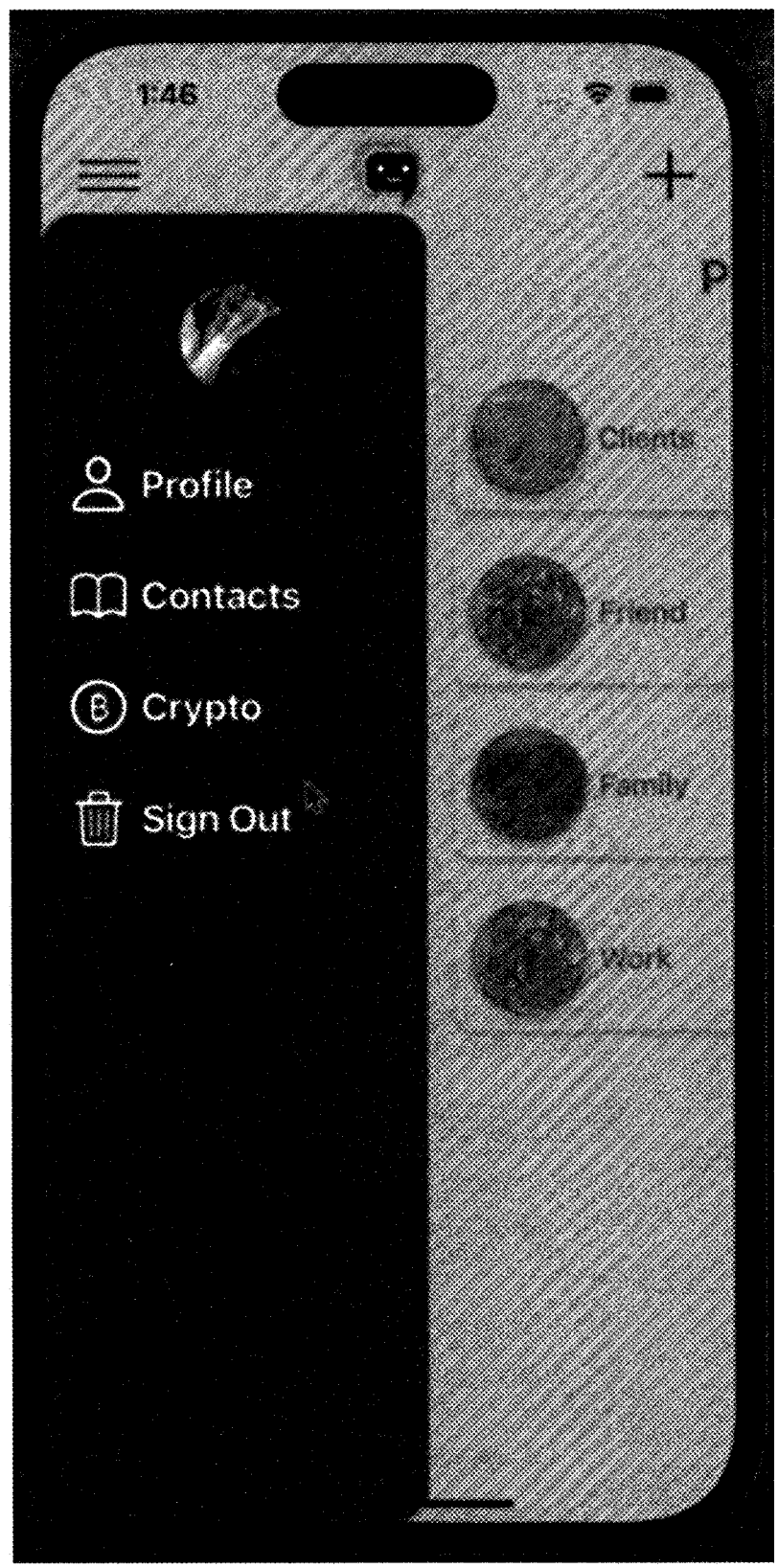
Figure 4G: Menu options

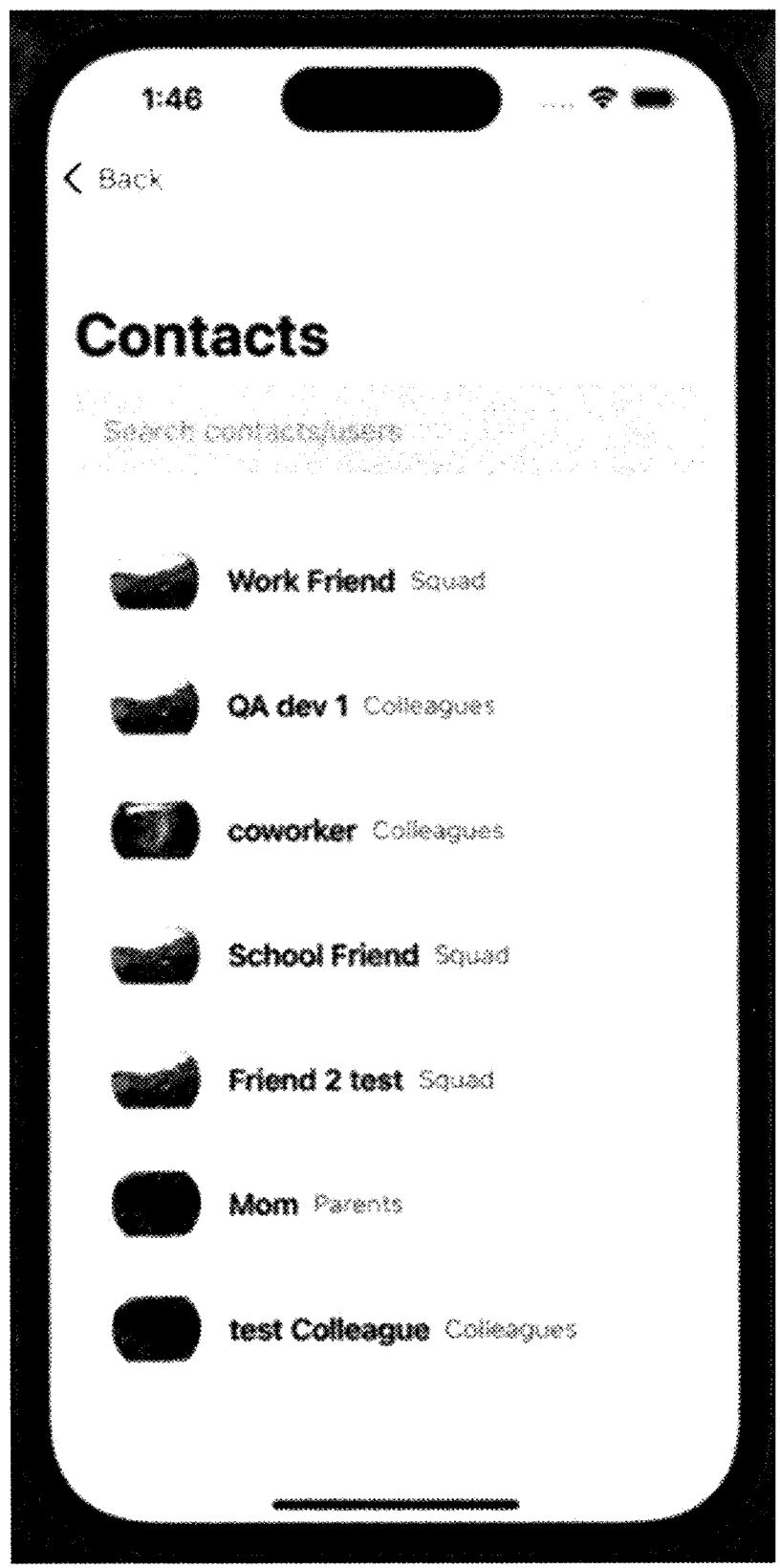
Figure 4H: Contacts View

Figure 4I: Add New Contact View

Figure 4J: Messages View (View messages that belong to the chosen subpillar)

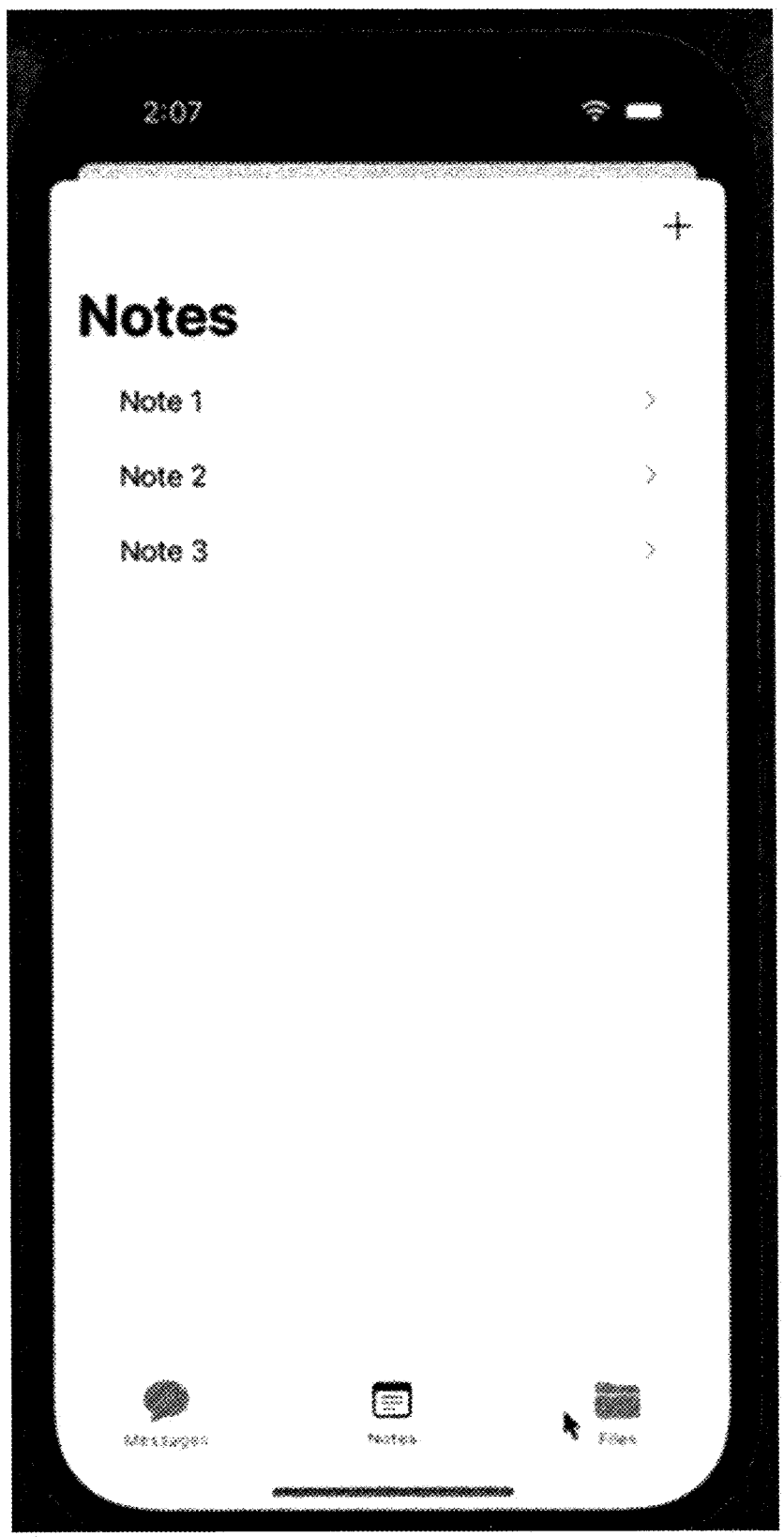
Figure 4K: Notes View (View notes that belong to the chosen subpillar)

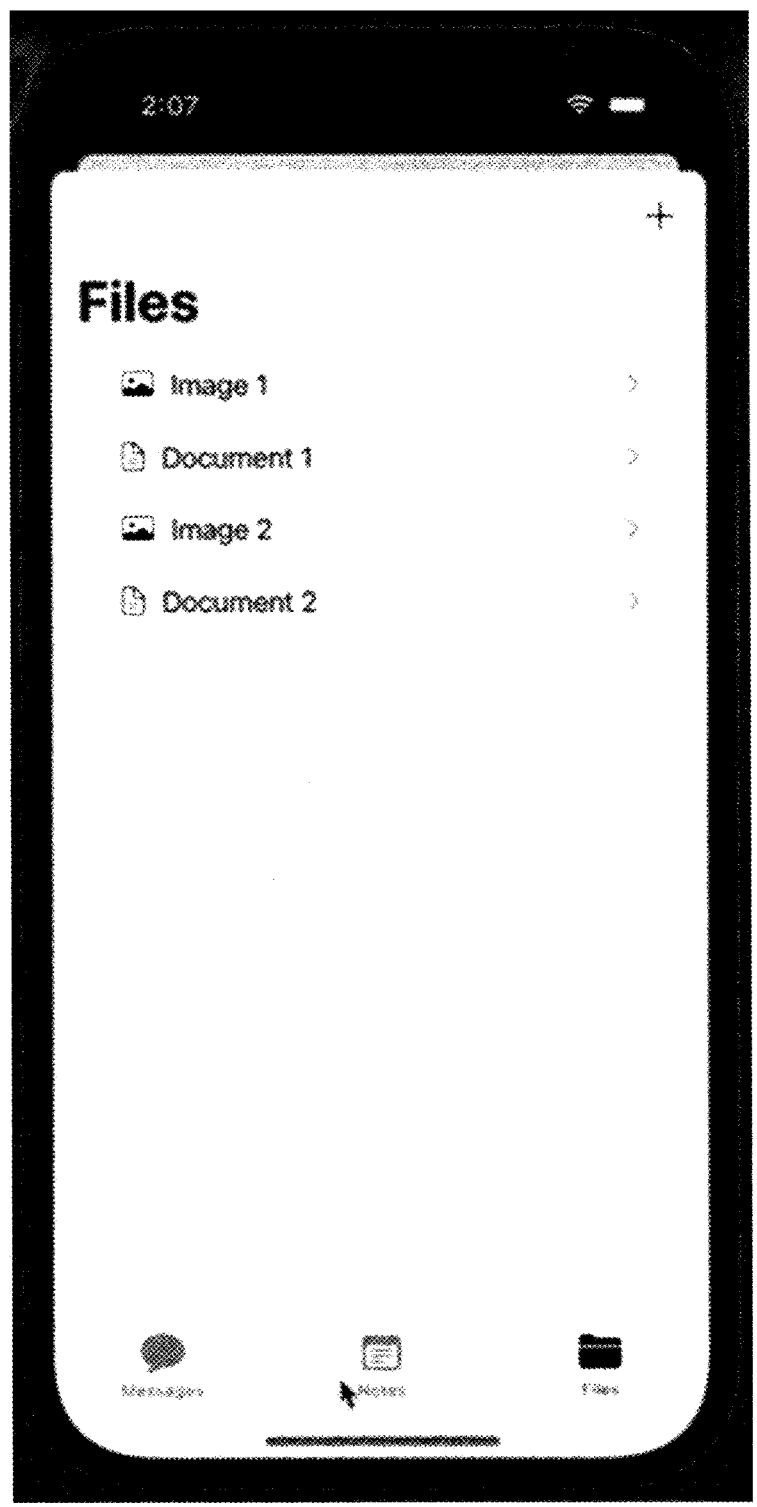
Figure 4L: Files View (View files that belong to the chosen subpillar)

```
struct AuthToken {
    let platform: String
    let token: String
} let facebookToken = AuthToken(platform: "Facebook", token: "FB_TOKEN_HERE")
let googleToken = AuthToken(platform: "Google", token: "GOOGLE_TOKEN_HERE")
let appleToken = AuthToken(platform: "Apple", token: "APPLE_TOKEN_HERE")

let authTokens: [AuthToken] = [facebookToken, googleToken, appleToken]

for authToken in authTokens {
    print("Platform: \(authToken.platform), Token: \(authToken.token)")
}
```

Figure 6

```
func fetchGmailMailboxData() {
    let accessToken = "YOUR_ACCESS_TOKEN"
    let baseURL = "https://www.googleapis.com/gmail/v1/"
    // Fetch a list of messages
    let messagesListURL = "\(baseURL)users/me/messages"

AF.request(messagesListURL, headers: ["Authorization": "Bearer \(accessToken)"]).responseJSON { response in
        switch response.result {
        case .success(let value):
            if let data = value as? [String: Any], let messages = data["messages"] as? [[String: Any]] {
                for message in messages {
                    if let messageId = message["id"] as? String {
                        print("Message ID: \(messageId)")
                        // Fetch more details about the message using messageId
                        // You can make another request to fetch message details
                    }
                }
            }
        case .failure(let error):
            print("Error fetching mailbox data: \(error)")
        }
    }
}
fetchGmailMailboxData()
```

Figure 7

MESSAGING APPLICATION INFORMATION ORGANIZER

CROSS-REFERENCE TO RELATED APPLICATIONS

This application claims priority to U.S. Provisional Patent Application No. 63/545,696 filed Oct. 25, 2023, which is incorporated by reference herein.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

Electronic communication among individuals is increasingly occurring within smartphone apps, and particularly messaging apps and chat apps, instead of using conventional email. Popular messaging and chat apps include WhatsApp, Instagram, Facebook Messenger, and iMessage. Each of these apps allows a community of members to freely message and chat with one another. One disadvantage of these apps is that they generally operate in their own respective platforms which are siloed from each other. Thus, if an individual uses WhatsApp on their device to send a message to another WhatsApp community member, the message is sent to the WhatsApp platform, and the message can only be retrieved and responded to via WhatsApp. Thus, the message recipient must open WhatsApp on their device to find and respond to the message. Similarly, if the same individual uses iMessage on their device to send a message to another iMessage community member (all iphones belong to the iMessage community), the message is sent to the iMessage platform, and the message can only be retrieved and responded to via iMessage. Thus, the message recipient must open iMessage on their device to find and respond to the message. This siloing of messaging app and chat app platforms creates inconvenience for users, especially if their communications are largely between a small number of persons. Consider, for example, a parent who regularly communicates with multiple children. These family members may need to constantly navigate between different platforms to engage in communications with each other.

Peer-to-peer payment apps such as Venmo and Zelle suffer from the same deficiencies discussed above regarding messaging apps and chat apps.

Accordingly, there is a need for an interface that allows for communication that occurs by a plurality of separate messaging and chat apps, as well as peer-to-peer payment apps, to be presented in a single app which is interconnected to each of the existing separate messaging and chat apps, and peer-to-peer payment apps, thereby organizing and simplying the messaging and chat process, and payment process, for users of these apps.

SUMMARY OF THE INVENTION

A multi-entity organizing system designed to streamline and optimize data management is provided by a unified platform for labeling and organizing various entities. The system employs a hierarchical structure of "Pillars" and "Subpillars" to categorize and tag data objects, such as contacts, messages, files, notes, and more, into cohesive groups. By utilizing these labels, efficient data retrieval, seamless cross-referencing, and simplified organization, is provided for such items, ultimately offering a comprehensive solution to consolidate diverse data within a single application.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings, embodiments which are presently preferred. It should be understood, however, that the invention is not limited to the precise arrangements and instrumentalities shown. In the drawings:

FIG. 3 shows one preferred embodiment of the Pillars/Subpillars database (NoSQL) structure.

FIG. 6 shows one example of software code for saving authentication tokens in accordance with one preferred embodiment of the present invention.

FIG. 7 shows one example of software code for retrieving messages from Gmail in accordance with one preferred embodiment of the present invention.

DETAILED DESCRIPTION OF PREFERRED EMBODIMENTS

Certain terminology is used herein for convenience only and is not to be taken as a limitation on the present invention. The words "a" and "an", as used in the claims and in the corresponding portions of the specification, mean "at least one."

I. Technical Disclosure

The multi-entity organizing system operates through a user-friendly interface that enables users to create, manage, and customize "Pillars" and their respective "Subpillars." Each Pillar represents a high-level label category, while Subpillars serve as subcategories or tags within the Pillar. Users can attach one or more Pillars or Subpillars to data entities, allowing versatile and adaptable labeling.

Key features of multi-entity organizing system include the following:

i. Pillars and Subpillars: The Pillars and Subpillars create a hierarchical labeling structure. Pillars represent broad categories, and Subpillars offer further granularity for data classification.

ii. Data Labeling: Users can assign Pillars and Subpillars to individual data entities, enabling cross-referencing and association between related information.

iii. Unified Data Management: The system consolidates data from various sources, such as contacts, messages, files, and notes, providing a single application to access and manage diverse information.

iv. Efficient Data Retrieval: With the aid of Pillars and Subpillars, users can swiftly retrieve specific data based on customized labels, thereby streamlining data retrieval processes.

v. Contextual Organization: The hierarchical organization of Pillars and Subpillars allows users to view data entities within relevant contexts, leading to a more coherent and organized information structure.

vi. Seamless Integration: The system seamlessly integrates into existing applications and services, enhancing data organization capabilities without disrupting user workflows.

vii. Scalability and Customization: The system allows users to create, modify, and delete Pillars and Subpillars according to their evolving needs, ensuring scalability and adaptability.

Figure 1A:
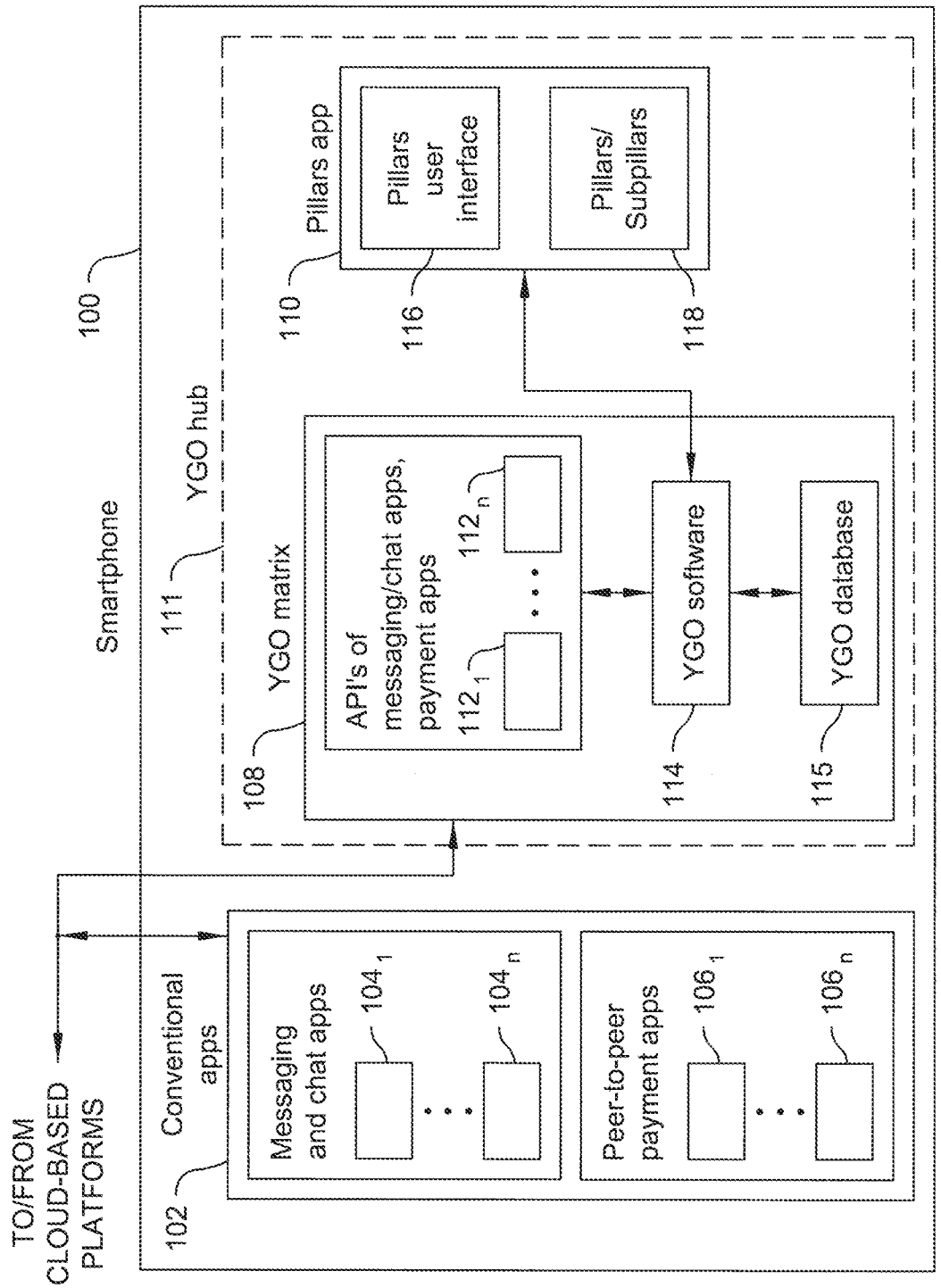
FIGS. 1A-1C are schematic diagrams of system architectures for preferred embodiments of the present invention.

FIG. 1A is a schematic diagram of system architecture for one preferred embodiment of the present invention. The system architecture is illustrated in the context of a smartphone device (smartphone) 100. However, any device that allows for execution of apps may implement this system architecture, such as tablets, laptop computers, and desktop computers.

The smartphone 100 optionally includes a plurality of conventional apps 102 (third-party apps). As is known in the art, a "third-party app" is a software application that is developed by a company or individual other than the manufacturer of the device or operating system on which the app runs. Third-party apps are typically downloaded from official app stores, such as the Apple App Store and Google Play Store, or from third-party app stores and websites. Examples of such apps include messaging and chat apps $104_1$-$104_n$ (collectively referred to herein as "messaging/chat apps 104") and peer-to-peer payment apps $106_1$-$106_n$ (collectively referred to herein as "payment apps 106"). Non-exhaustive examples of conventional messaging/chat apps include WhatsApp, WeChat, Facebook Messenger, Telegram (Telegram Messenger), LINE, Skype, Instagram, iMessage, and Google Chat. Non-exhaustive examples of conventional payment apps include Apple Pay, Google Pay, Samsung Pay, Zelle, Venmo, and PayPal. Most smartphone users will install at least one messaging/chat app. Payment apps are growing in popularity and some of these apps, such as Apple Pay, come built into or preloaded with a new smartphone. The downloading and initial setup of these apps occurs in a conventional manner. Preferred embodiments of the present invention leverage these existing apps as described below.

Each third-party app has a corresponding platform, typically in the "cloud." For example, WhatsApp has a remote server that is accessed via an electronic network (e.g., the internet). Similarly, Facebook Messenger has a remote server. Each of these platforms include their own proprietary communication software, which may also include application program interfaces (API's), that allows for communication between the respective platforms and their users who may be accessing the platforms via any number of devices (e.g., smartphones, tablets, laptops, desktop computers, and the like). Thus, it is not necessary to install an app on a device to communicate with most third-party apps. That is, while communication via apps installed on a device is a very common way to interface with such platforms, communication may occur directly with the platforms as long as the user has an internet connection. For example, a user may log into their messaging app platform (remote server) via a web browser and have access to the same functionality as using the messaging app on a device.

Figure 1B:
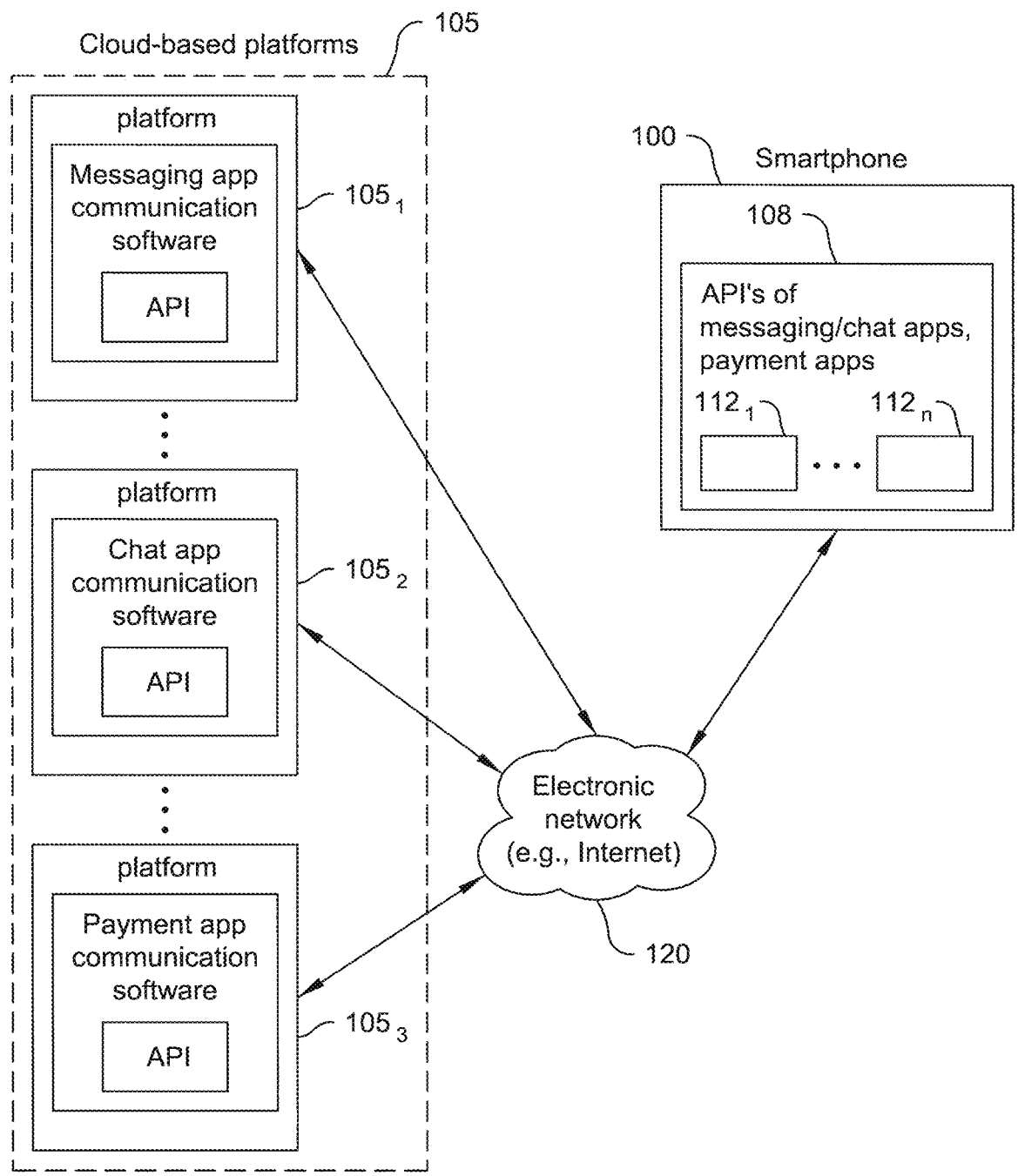

FIG. 1B shows a plurality of cloud-based platforms 105, including messaging app platform $105_1$, chat app platform $105_2$, and peer-to-peer payment app platform $105_3$. Each of these app platforms may correspond with one of the apps 102 shown in FIG. 1A. For example, if messaging and chat app $104_1$ in FIG. 1A is WhatsApp, then platform $105_1$ hosts the WhatsApp remote server and includes the messaging app communication software that is necessary to communicate with the app $104_1$, as well as directly with other non-app gateways such as web browsers. Similarly, if peer-to-peer payment app $106_1$ in FIG. 1A is Venmo, then platform $105_3$ hosts the Venmo remote server and includes the payment app communication software that is necessary to communicate with the app $106_1$, as well as directly with other non-app gateways such as web browsers.

In one preferred embodiment of the present invention, two additional components execute on the smartphone 100, namely, a first software component referred to herein as "YGO matrix 108" and a second software component referred to herein as "Pillars app 110.") Although the YGO matrix 108 is illustrated in FIG. 1A as being separate from the Pillars app 110, in one preferred embodiment, the YGO matrix 108 may be located in the Pillars app 110. This may be necessary due to the architecture of smartphones wherein outside (non-native) software typically are contained within a downloaded app. Collectively, the YGO matrix 108 and the Pillars app 110 is referred to herein as a YGO hub 111. The YGO hub 111 may also be considered to be a third-party app, especially because it includes the Pillars app 110, which, in one preferred embodiment, is likewise downloaded from an official app store.

The YGO matrix 108 includes separate API's for each of the messaging/chat apps 104 and each of the payment apps 106 that the user desires to communicate with, which may optionally be installed on the smartphone 100. These API's are labeled as $112_1$-$112_n$, and are collectively referred to as "API's 112." These API's are conventional and perform the well-known function of sending and receiving data to and from a particular messaging/chat app platform or payment app platform (cloud-based platforms of FIG. 1B). For example, WhatsApp has a corresponding API, Facebook Messenger has a corresponding API, and Venmo has a corresponding API. The YGO matrix 108 simply consolidates all of these API's into one location. If the YGO matrix 108 is lacking an API for a particular messaging/chat app platform or payment app platform (cloud-based platform 105), then the Pillars app 110 cannot interact with the particular messaging/chat app platform or payment app platform (cloud-based platforms 105) since the API 112 is needed for sending and receiving data to and from the particular messaging/chat app platform or payment app platform (cloud-based platforms 105). These API's are not part of the downloaded apps 104 and 106, and are typically made available by the app provider on a restricted basis. As is well-known in the art, an API is a way for two or more computer programs to communicate with each other. It is a type of software interface, offering a service to other pieces of software.

The YGO matrix 108 also includes YGO software 114 which provides an interface between the API's 112 and the Pillars app 110. The API's 112 allow the Pillars app 110 to interface with the respective messaging/chat app platform or payment app platform (cloud-based platforms 105). In this manner, the smartphone user may simplify their interactions with multiple messaging/chat app platforms or payment app platforms (cloud-based platforms 105) by using only one app, namely, the Pillars app 110. The YGO matrix 108 further includes YGO database 115 which is where data associated with Pillars app 110 is stored.

To further clarify the flow of communications, the YGO matrix 108 communicates with the platforms 105 via the API's 112, not with the corresponding apps 102 that may optionally be installed on the smartphone 100. This interaction is best illustrated in FIG. 1B which shows only portions of the smartphone 100 (illustrated in more detail in FIG. 1A) that are necessary for understanding the flow of communications with the platforms 105. In the case of a smartphone device (here, smartphone 100), communication also requires a cell network (not shown), as well as an electronic network 120, such as the internet.

Lastly, the Pillars app 110 includes Pillars user interface 116 and Pillars/Subpillars data structure 118, both of which are described in more detail next.

Figure 2:
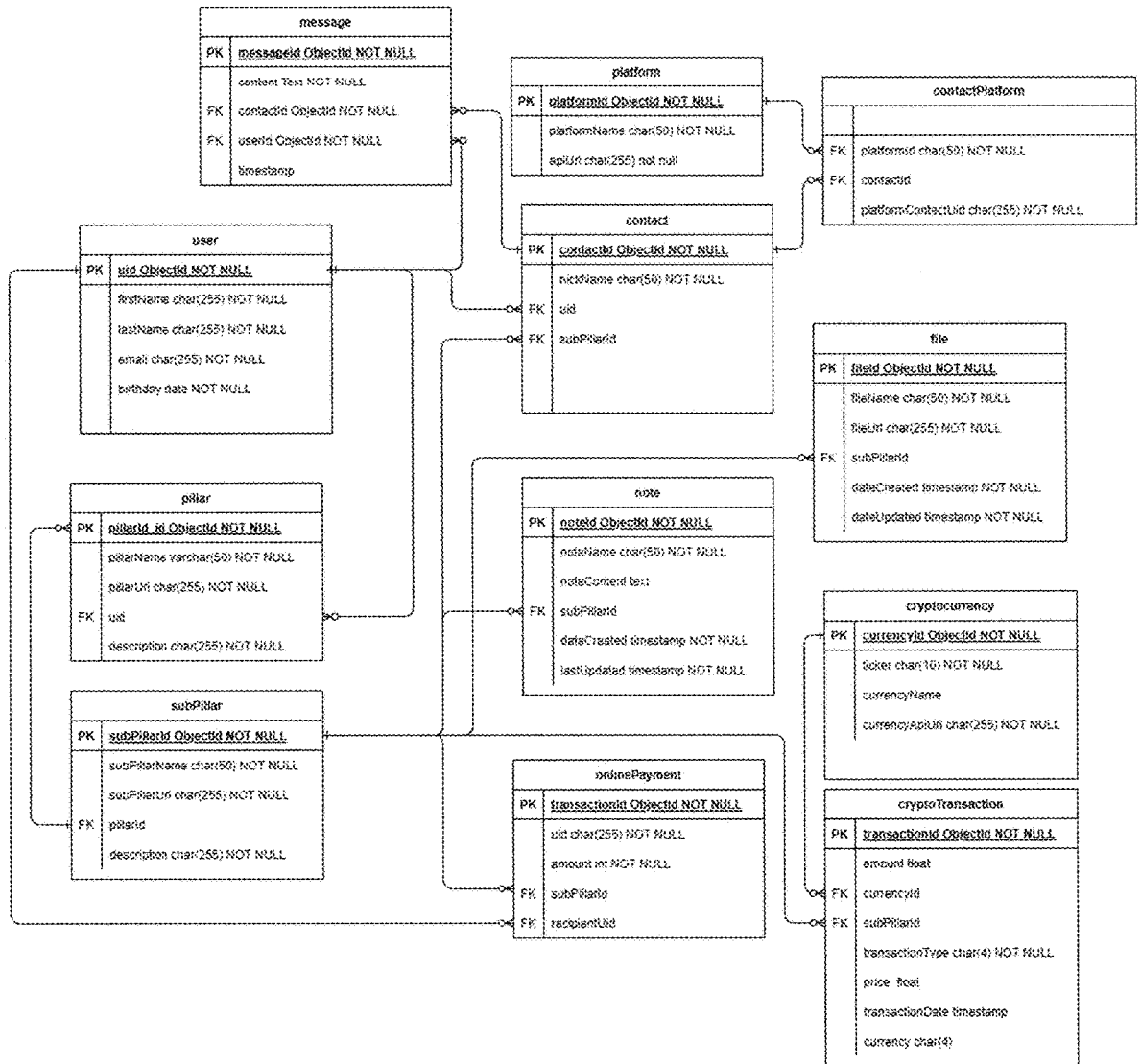
FIG. 2 is an Entity Relationship Diagram (ERD) of one preferred embodiment of the Pillars/Subpillars data structure 118.

FIG. 2 is an Entity Relationship Diagram (ERD) of one preferred embodiment of the Pillars/Subpillars data structure 118. The following details further explain the entities of the ERD.

1. User: Represents a System User.
    Pillar: Represents a high-level label category.
    Subpillar: Represents a subcategory or tag within a Pillar.
    Contact: Represents a contact associated with the user.
    Message: Represents a message exchanged between users within a conversation.
    File: Represents a file shared between users.
    Note: Represents a note created by a user.
    Online Payment: Represents an online payment transaction.
    Cryptocurrency: Represents a type of cryptocurrency.
    Portfolio: Represents a user's cryptocurrency portfolio. No entity is shown in the ERD for Portfolio because the portfolio is procedurally generated based on the transactions.
    CryptoTransaction: Represents a transaction involving cryptocurrencies within a portfolio. This document indicates where the entries are saved for every buy/sell the user has made for crypto. This also records the date and price of the transaction which is then compared to the current price in order to calculate the gain/loss for that transaction.
    Platform: Platform represents the messaging platform currently available in the Pillars app 110. This will contain the necessary information to allow the Pillars app 110 to interact with other messaging and chat apps.
    Contact Platform: The Pillars app 110 consolidates multiple messaging platforms into a single interface, allowing users to communicate seamlessly across various services such as Facebook Messenger, WhatsApp, Telegram, and more. Each contact's availability on these platforms is represented as an entry in the "Contact Platform" section when added by the user.
2. Relationships:
    User can have multiple Pillars.
    Pillar can have multiple Subpillars.
    User can have multiple Contacts.
    User can exchange multiple Messages with other Users.
    User can share multiple Files.
    User can create multiple Notes.
    User can make multiple Online Payments.
    User can have multiple Portfolios.
    Portfolio can contain multiple Cryptocurrencies.
    Portfolio can have multiple Transactions.
3. Attributes:
    User: UserID, Username, Email, Password, etc.
    Pillar: PillarID, UserID (FK), PillarName, Description, etc.
    Subpillar: SubpillarID, PillarID (FK), SubpillarName, Description, etc.
    Contact: ContactID, UserID (FK), ContactName, ContactDetails, etc.
    Message: MessageID, UserID (FK), ContactID (FK), Content, Timestamp, etc.
    File: FileID, UserID (FK), FileName, FilePath, Timestamp, etc.
    Note: NoteID, UserID (FK), NoteContent, Timestamp, etc.
    Online Payment: PaymentID, UserID (FK), PillarID (FK), Amount, PaymentDate, etc.
    Portfolio: PortfolioID, UserID (FK), PillarID (FK), PortfolioName, Description, etc.
    Transaction: TransactionID, PortfolioID (FK), CryptoID (FK), Amount, TransactionDate, etc.
    CryptoTransaction: TransactionId, currencyId (FK), amount, subpillarId (FK), transactionType (buy/sell), price (price at which the cryptocurrency is bought/sold), currency (fiat/other currencies used to make the transaction/what the currency is bought with or sold for), transactionDate
    Cryptocurrency: currencyId, currencyName, ticker (abbreviation for the currency. e.g., BTC, ETH, USDT, XRP, BNB, etc), currencyApi (represents the URL where the app can pull the info about the currency, such as current exchange rate, trading volume, etc.)

Figure 3:
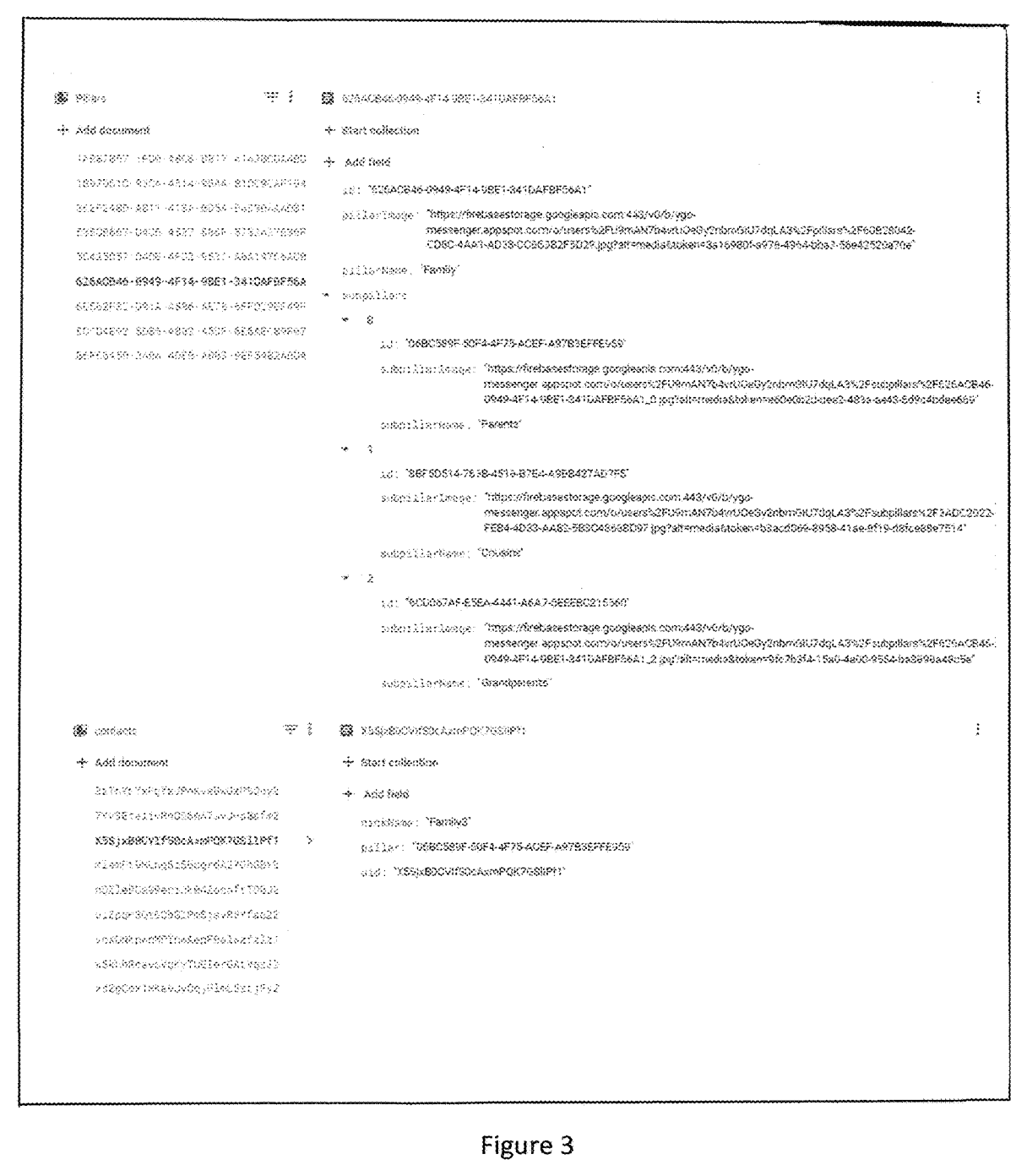

FIG. 3 shows one preferred embodiment of the Pillars/Subpillars database (NoSQL) structure. (NoSQL is a non-relational data structure). Referring to FIG. 3, details of the data structure are as follows:

1. Pillars and Subpillars:
    Pillars: These are high-level categories or containers in your NoSQL database. Think of them as folders or directories that help organize data.
    Subpillars: These are subcategories or subcontainers within the pillars. Subpillars are nested within pillars and further refine the organization of data.
2. Pillar Document:
    In NoSQL, a "document" is a basic unit of data storage, similar to a row in a relational database. The "pillar document" contains information about a specific pillar, including its attributes like name, ID, and an image URL.
3. Subpillar Array:
    An "array" in NoSQL is a data structure that holds an ordered collection of values. The "subpillar array" is a collection of subpillars associated with a particular pillar. It allows you to store multiple subpillars within a single pillar document.
4. ID (Identifier):
    An "ID" or "identifier" is a unique value that distinguishes each pillar or subpillar. It ensures that each document in the database has a unique reference.
5. subpillarImage:
    An "image URL" is a link or address that points to an image file stored elsewhere, typically on a server. It is used to specify the location of an icon or image associated with a pillar or subpillar.

6. Associating Data:

In a NoSQL database, one can associate or link related data by using IDs. For example, the subpillar's ID may be used to associate contacts, files, notes, and other items with that specific subpillar. This creates a structured relationship between different types of data.

7. Contacts, Files, Notes:

These are examples of data types or entities that can be associated with subpillars. The app organizes these entities under subpillars to provide users with a structured way to manage and access their data.

In summary, the app uses a NoSQL database to organize data into pillars and subpillars. Pillars are top-level categories, and subpillars are nested within them. Each pillar and subpillar is represented as a document, with unique IDs and attributes such as names and image URLs. Subpillars serve as containers for associating various data types, like contacts, files, and notes, providing users with a flexible and organized way to manage their information.

Figure 4A:
FIG. 4A is an iconic representation of one of the concept of Pillars.

FIG. 4A illustrates the concept of Pillars in an iconic form.

FIGS. 4B-4L show sample user interface display screens (Pillars user interface 116) for the Pillars app 110 in accordance with one preferred embodiment of the present invention.

FIG. 4B: Pillars View: The App's main view.

FIG. 4C: Add Pillar

FIG. 4D: Subpillar View

FIG. 4E: Add Subpillar

FIG. 4F: Edit Subpillar

FIG. 4G: Menu options

FIG. 4H: Contacts View

FIG. 4I: Add New Contact View

FIG. 4J: Messages View (View messages that belong to the chosen subpillar).

FIG. 4K: Notes View (View notes that belong to the chosen subpillar).

FIG. 4L: Files View (View files that belong to the chosen subpillar).

The following explanation relates to selected user interface display screens.

Picture a user's contact list as a building, each category being a pillar, holding it up. (FIG. 4A) For example, there are pillars for family, friends, work, and so on. Within each pillar, the user can create subpillars. For instance, the family pillar could have subpillars such as cousins, siblings, and the like. This reduces the scrolling time to locate a contact. The user simply select the relevant pillars, navigates to the appropriate subpillar and then the relevant contacts will be listed there is a much shorter list.

FIG. 4B is a main screen with different categories called pillars. These pillars help you group your contacts and information into meaningful categories. You can add pillars (FIG. 4C), edit and delete pillars, and also give them a unique image to represent the category. Clicking on a pillar shows the subpillars that belong to that pillar. (FIG. 4D). The user can add, edit and delete subpillars. (FIGS. 4E, 4F).

To add a contact from the main screen (FIG. 4B), click on the sidebar button or swipe towards the right, and menu options appear. (FIG. 4G). Then click on "Contacts." For security reasons, browsing of users isn't permitted, so the user will need to have the full email address of the entity that user wants to add in order to have the option to add them. The user enters the email address of the contact that the user would like to add. (FIG. 4H-Search contacts/users). The user then clicks on the link that shows up (not shown) and then sets the options for the contact that is to be added, including the nickname, and which pillar and subpillar it should belong to. (FIG. 4I). When the user clicks on a subpillar, the page that contains notes, files and messages that belong to that subpillar appears. (FIG. 4J, 4K, 4L) The user can see the contact that was just added among the list of users that can be messaged from the subpillar that it belongs to.

Referring again to FIG. 1A, the YGO software 114 provides an interface between the API's 112 and the Pillars app 110, and, in turn, the API's 112 allow for sending and receiving data to and from a particular app 102. In this manner, the Pillars app 110 may seamlessly interface with one or more of the apps 102 without requiring the smartphone user to actively log into the respective apps 102 that the user needs to interact while using the Pillars app 110. Since it is still necessary to log into an app 102 to interact with it, the login process works in the background, invisible to the user of the Pillars app 110.

Figure 1C:
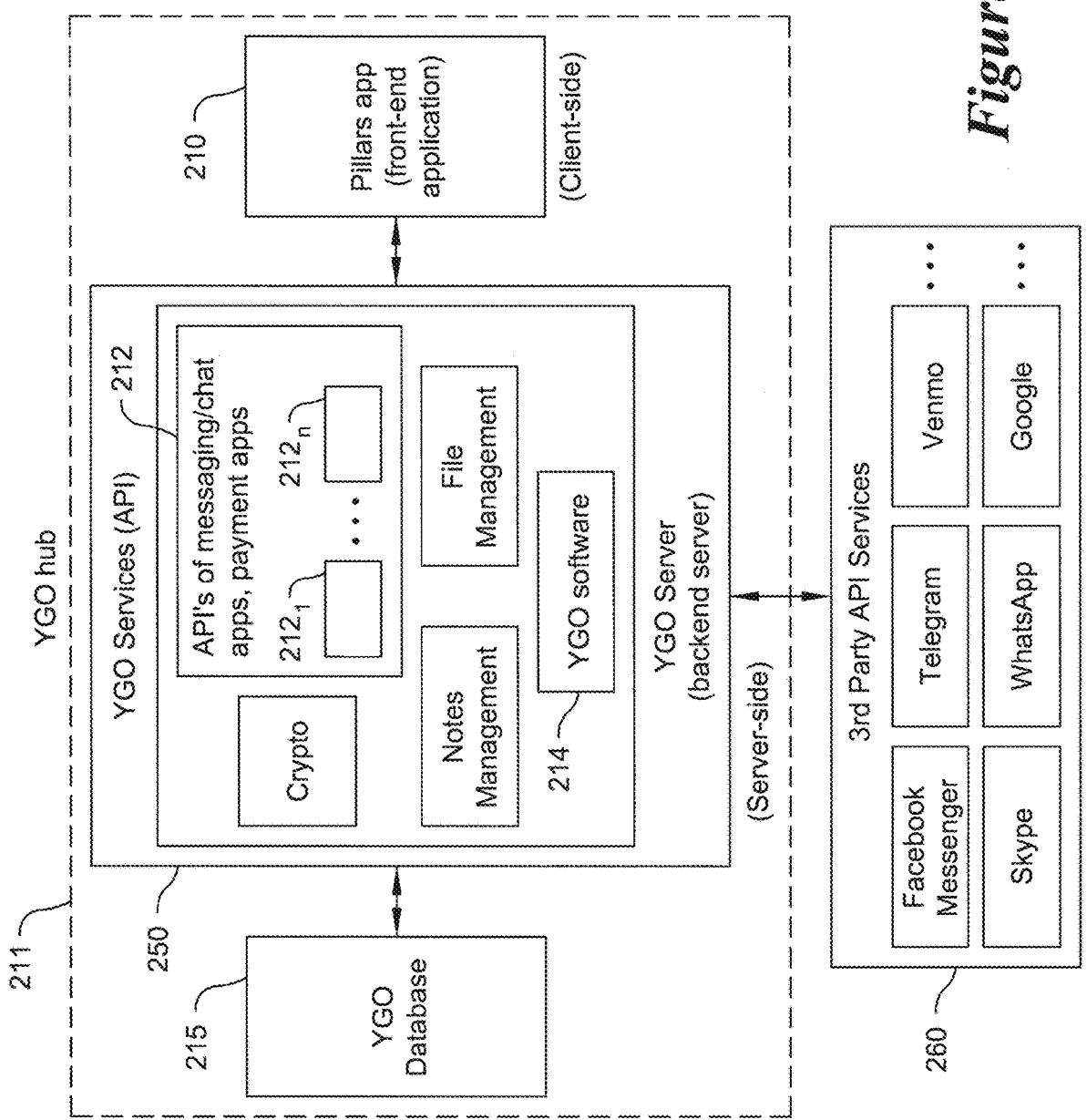

FIGS. 1A and 1B collectively show one embodiment of system architecture for implementing the present invention. FIG. 1C shows another embodiment of system architecture for implementing the present invention. In this embodiment, the YGO hub 111 of FIG. 1A, labeled as YGO hub 211 in FIG. 1C, is a three-tier application, including a database (YGO Database 215), a backend server (YGO server 250, also interchangeably referred to herein as a "remote messaging app server"), and a front-end application (Pillars app 210 which performs the same functions as the Pillars app 110 of FIG. 1A). As is well-known in the art, a "backend server" is a computer program that runs on a server and is responsible for the logic and data storage of a website or application (here, the Pillars app 210). It is also known as the server side of the application. The backend server is responsible for handling user requests, processing data, and generating responses. As is also well-known in the art, a "front-end application" is the part of a website or mobile app (here, the Pillars app 210 which is installed in a user's smartphone 100) that users interact with directly. It is also known as the client side of the application. The front-end is responsible for the user interface (UI) and user experience (UX) of the application. The YGO server 250 hosts YGO services for the Pillars app 210 (e.g., Crypto, Online Payments, Messaging/Chat, Notes Management, and File Management). YGO software 214 (which performs the same functions as the YGO software 114 of FIG. 1A), and acts as a mediator between YGO Database 215 (which is where YGO Services save their data) and the front-end application (Pillars app 210). In this manner, the Pillars app 210 does not directly communicate with the YGO Database 215. The YGO server 250 also interfaces with third-party API services 260, which include the API's of the cloud-based platforms discussed above. To allow for this interfacing, the YGO Services include separate API's for each of the messaging/chat apps and each of the payment apps that the user desires to communicate with. These API's are labeled as $212_1$-$212_n$, and are collectively referred to as "API's 212." These are the same API's 112 ($112_1$-$112_n$) described above with respect to FIGS. 1A and 1B.

The Pillars app 210 thus connects only to the YGO server 250, and the YGO server 250 interprets the API data that is sent and received to and from the third-party cloud-based platforms in conjunction with the respective API's 212 for the particular third-party cloud-based platform(s) that the Pillars app 210 needs to communicate with. In this manner, to connect with an API of a cloud-based platform, the connection occurs through the YGO server 250, and not the Pillars app 210. Accordingly, the Pillars app 210 is not given direct access to the third-party API's of the cloud-based platforms, and only the backend server (YGO server 250)

has such access. FIG. 1C thus differs from FIG. 1A mainly in the physical location and execution location of the YGO matrix 108 components which occurs within the smartphone 100 in FIG. 1A, but which occurs within a backend server and remote database in FIG. 1C. However, the overall functionality of these two embodiments is the same.

As further background to the embodiment of FIG. 1C, servers can only send and receive API data where the format is either JSON or XML. In one example, the Pillars app 210 sends a JSON-formatted message/command to the YGO server 250 and then receives back a JSON-formatted message from the YGO server 250 as a response. The Pillars app 210 then interprets the JSON-formatted response into easily readable information. In order for the Pillars app 210 to communicate with one of the third-party API services 260, it must first communicate with the YGO server 250 with a request, which is then processed by the YGO server 250 and sent by the YGO server 250 to the appropriate third-party API service 260. The third-party API service 260 then sends back a response to the YGO server 250, which, in turn, relays it to the Pillars app 210 using the respective API's 212.

Figure 5:
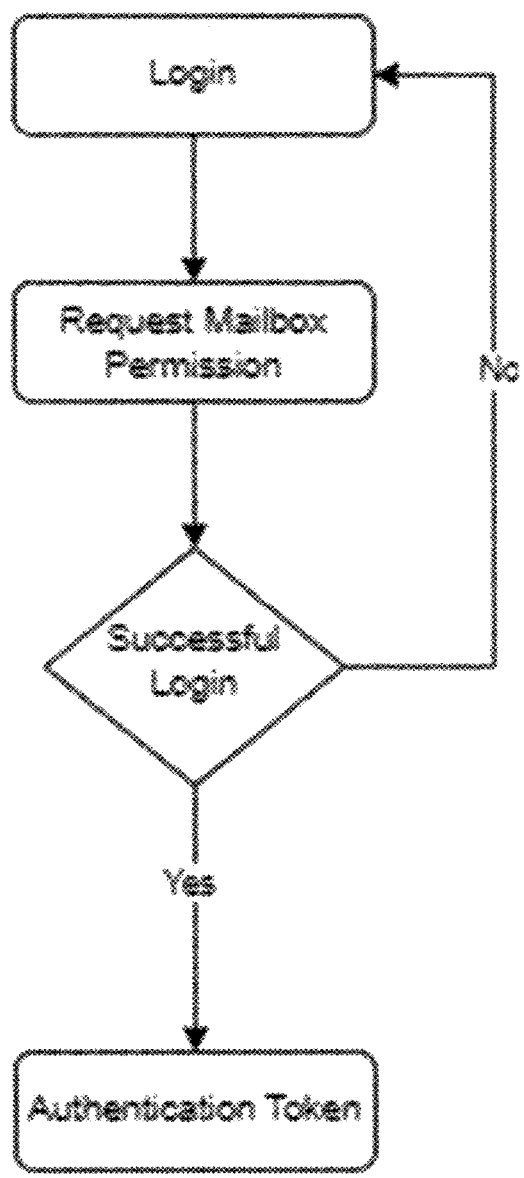
FIG. 5 shows a flowchart of a process for receiving an authentication token for logging into a particular app.

FIG. 5 shows a flowchart of a process for receiving an authentication token for logging into a particular app 102. The authentication token will be used to access any data that the user has given permission to access. Having multiple messaging and chat platforms connected to one app (here, the Pillars app 110) means that there will be multiple authentication tokens. Once the Pillars app 110 is given access to a user's mailbox within a particular app 102, messages may be sent and retrieved. Each authentication token will be systematically labeled with the corresponding messaging or chat platform to enable access for the Pillars app 110.

FIG. 6 shows one example of software code (code snippet) for saving authentication tokens associated with Facebook for accessing Facebook Messenger, Google for accessing Gmail or GooglePay, and Apple for accessing iMessage or ApplePay. This code is part of the YGO software 114.

FIG. 7 shows one example of software code (code snippet) for retrieving messages from Gmail via a Gmail app. In this example, the smartphone 100 would already have the Gmail app installed therein. The "messageID," "messageListURL," and "baseURL" in the code snippet is further explained as follows:

messageID: This is a special code that the Pillars app 110 uses to identify each message in the user's mailbox. It is like a fingerprint that is unique to each message. The Pillars app 110 can use this code to find, read, or delete the message from the database, which is where the Pillars app 110 stores all the messages.

messageListURL: This is a web address that the Pillars app 110 can use to get a list of all the messages in the user's mailbox for a specific platform. A platform is a service that allows people to send and receive messages, such as WhatsApp, Telegram, or Signal. The Pillars app 110 needs the user's permission to access their mailbox for each platform, otherwise it will not be able to see or use the messages.

baseURL: This is another web address that the Pillars app 110 uses to communicate with the platform's API. As also explained above, an API is a set of rules and instructions that the Pillars app 110 and the platform follow to exchange information, such as messages, contacts, or settings. The baseURL tells the Pillars app 110 where to find and how to use the API for each platform.

Figure 4M:
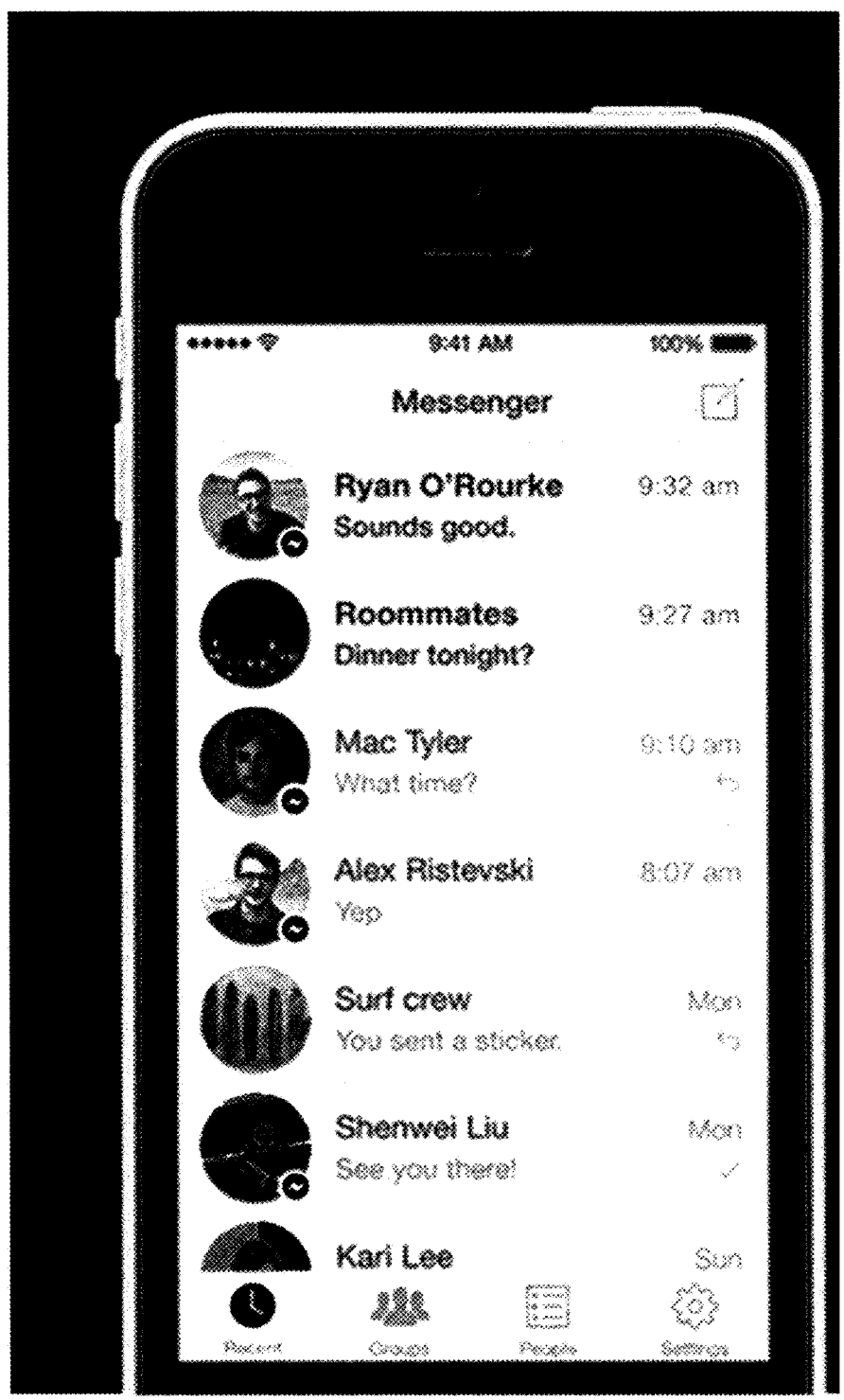
FIGS. 4B-4P show sample user interface display screens for a Pillars app in accordance with one preferred embodiment of the present invention.
Figure 4N:
Figure 40:
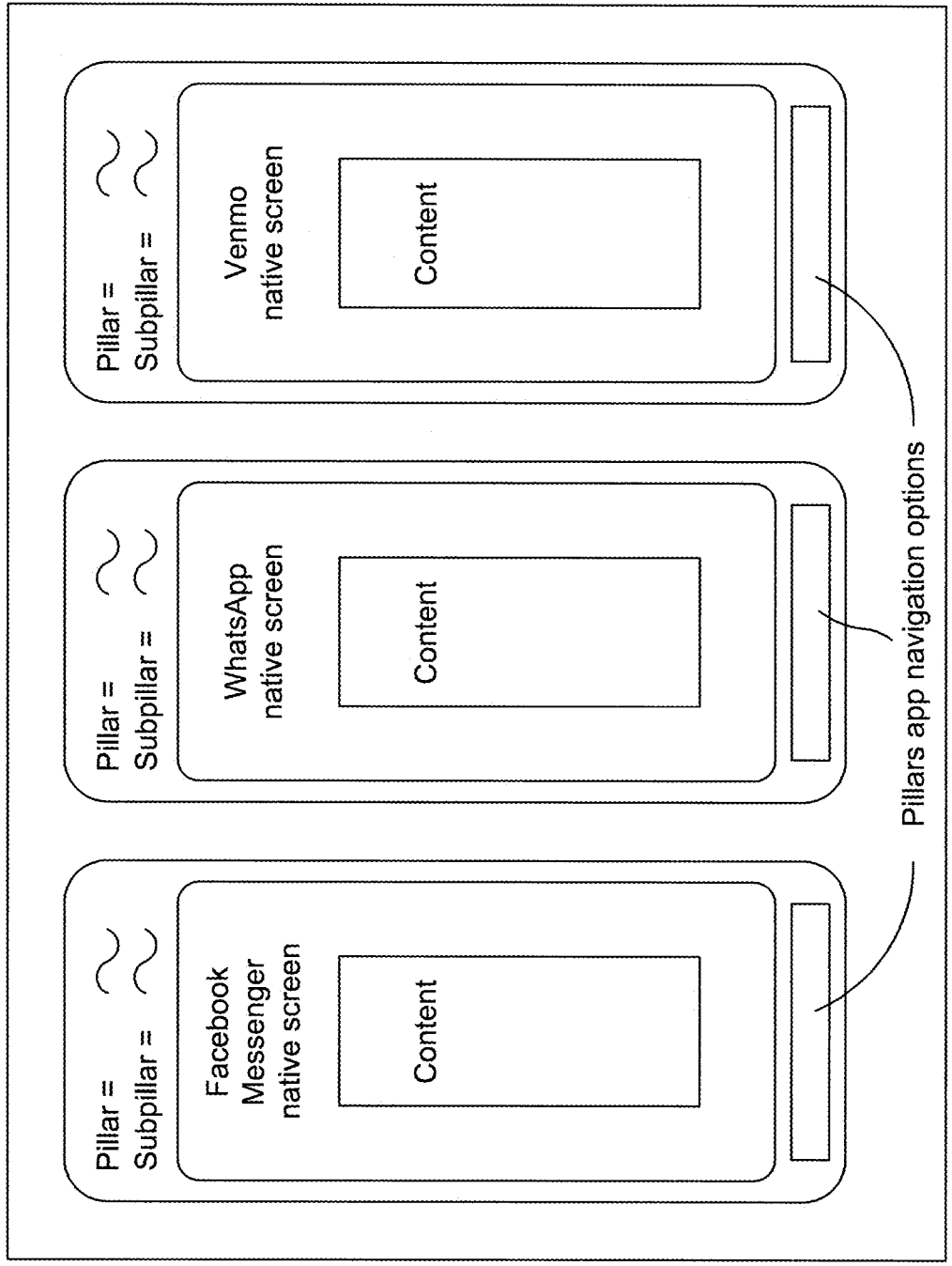

FIGS. 4M and 4N are sample user interface display screens for illustrating how the Pillars app interfaces with a particular messaging/chat app. In this example, the app is Facebook Messenger. FIG. 4M is a message list as viewed within the Pillars app, and FIG. 4N is a conversation that occurs within Facebook Messenger when it is integrated into the Pillars app. FIGS. 4M and 4N are native screens within Facebook Messenger. However, they appear within the Pillars app by using the API for Facebook Messenger which allows the Pillars app (frontend app) to interact with Facebook's backend, thereby allowing for the full functionality of Facebook Messenger to occur within the Pillars app (e.g., send/receive messages, call contacts on Facebook Messenger). FIGS. 4M and 4N are preferably displayed within a Pillars app shell (not shown in these figures) so that the user is aware that these native Facebook Messenger screens are being navigated to within the Pillars app, and not directly from a Facebook app. FIG. 4O illustrates this concept in the context of three different messaging/chat apps (e,g., Facebook Messenger, WhatsApp, Venmo) that a user of the Pillars app may interact with.

As further explanation of the integration of the Pillars app and a conventional messaging/chat app, the Study Group of FIG. 4N (which is an existing group chat previously established within Facebook Messenger) is also set up within the pillar/subpillar structure of the Pillars app. For example, there may be a Pillar for Group Chats, and then a subpillar for Study Group. Furthermore, when viewing a Contact in the Contacts view of FIG. 4H, there may be logos next to each Contact that indicates what conventional messaging/chat app the Contact is registered on, if any. For example, if the Contact is registered on WhatsApp and Venmo, there would be two logos next to each Contact, one for each of these apps. Alternatively, there may be multiple entries for the same Contact, each entry being associated with a particular conventional messaging/chat app that the Contact is registered on (e.g., John Smith—WhatsApp; John Smith—Venmo). Also, since the Pillars app may have its own messaging/chat functionality, a particular Contact is not required to be registered with any particular conventional messaging/chat app. In this manner, a user of the Pillars app can visually see which platforms may be used to communicate with a particular Contact and can select a desired platform when initiating a new message/chat. When a user responds to a message/chat received by a conventional messaging/chat app or payment app, the response is sent back to the Contact/sender via the same platform that it was received unless the user overrides this default mode and selects a different platform to receive the response from those noted in the Contacts entry.

Consider the following sample use cases, all of which apply to each of the different system architecture embodiments described above:

EXAMPLE 1: Assume that the user, Dad, has set up a pillar for Family and a subpillar Children for the user's two children, Jack and Jill.

In the last 24 hours, Jack and Jill have engaged in the following activities:

Jack sent a text to Dad via WhatsApp

Jack sent a message to Dad on Instagram (Dad follows Jack on Instagram)

Jill sent a text to Dad via iMessage (Jill and Dad both have iphones)

Jill sent a message to Dad on Facebook Messenger (Dad is friends with Jill on Facebook)

In a conventional interaction with a smartphone, the user (here, Dad) would need to navigate to four different apps to view and/or respond to these messages of his children. However, in a preferred embodiment of the present invention, Dad simply navigates to the subpillar Children and sees all four of these texts/messages, and can review and respond to them, if desired, all via the Pillars app.

EXAMPLE 2: The same user (Dad) has a new contact, Frank Simpson, to add to his Contacts. It is a work contact related to his professional life, and the user has already established a pillar for Work-Professional. The user wishes to add this contact to:

WhatsApp
WeChat
Skype

In a conventional interaction with a smartphone, the user would need to navigate to three different apps to enter this contact via the Pillars user interface. However, in a preferred embodiment of the present invention, the user simply navigates to the pillar for Work-Professional, enters the contact once, selects which app the contact should be active in (here, WhatsApp, WeChat, Skype), and the YGO software interfaces with the API's of these apps to perform whatever functions are necessary to add this contact, which may include sending an invite and waiting for an acceptance.

Similar to Example 1, after this contact is entered, any chat messages received from Frank Wilson via WhatsApp, WeChat, or Skype, and possibly other apps that the user did not select, are all received within the pillar for Work-Professional where the user may review and respond accordingly, again, all via the Pillars app.

EXAMPLE 3: The same user (Dad) wishes to send $100 to his son, Jack, for his birthday. Dad and Jack both have Venmo and Apple Pay accounts.

In a conventional interaction with a smartphone, the user would need to navigate to either Venmo or Apple Pay to complete this transaction. However, in a preferred embodiment of the present invention, the user simply navigates to the subpillar Children, selects Jack, and then selects either Venmo or Apple Pay.

II. Additional Considerations

A. Compatibility with Existing Messaging and Chat Apps

Messaging/chat may still occur via the individual apps if the user prefers to communicate in that manner for particular messaging/chat interactions. That is, a user may choose whether to communicate via the YGO app or via the conventional apps.

B. Use of Pillars App as a Stand-Alone Messaging/Chat App

The discussion above focuses on the use of the Pillars app 110 for integration with existing messaging/chat apps via their respective API's. However, the Pillars app 110 may include its own messaging/chat software for allowing direct messaging and chat with the Pillars app 110.

Figure 8:
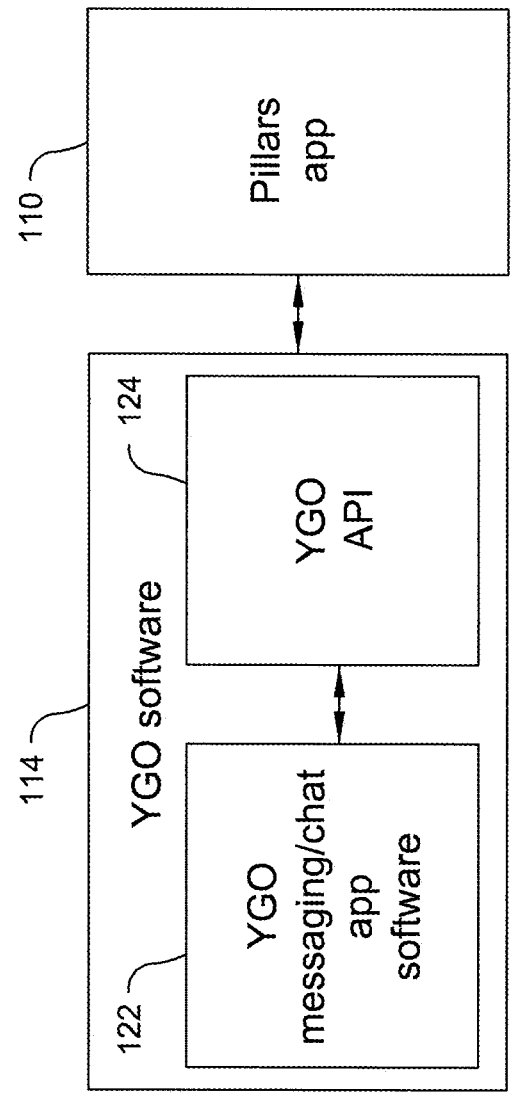
FIG. 8 shows an embodiment of the Pillars app which includes its own messaging/chat software for allowing direct messaging and chat with the Pillars app.

FIG. 8 shows one preferred embodiment of this functionality wherein YGO messaging/chat app software 122 resides in the YGO software 114, and also includes its own API 124. Similar to conventional messaging/chat apps, the YGO messaging/chat app software 122 may include any of the following well-known functionalities of such apps:

i. chat/messaging (real-time or asynchronous)
ii. peer-to-peer payments
iii. telephony (e.g., voice calling, video calling)

Figure 4P:
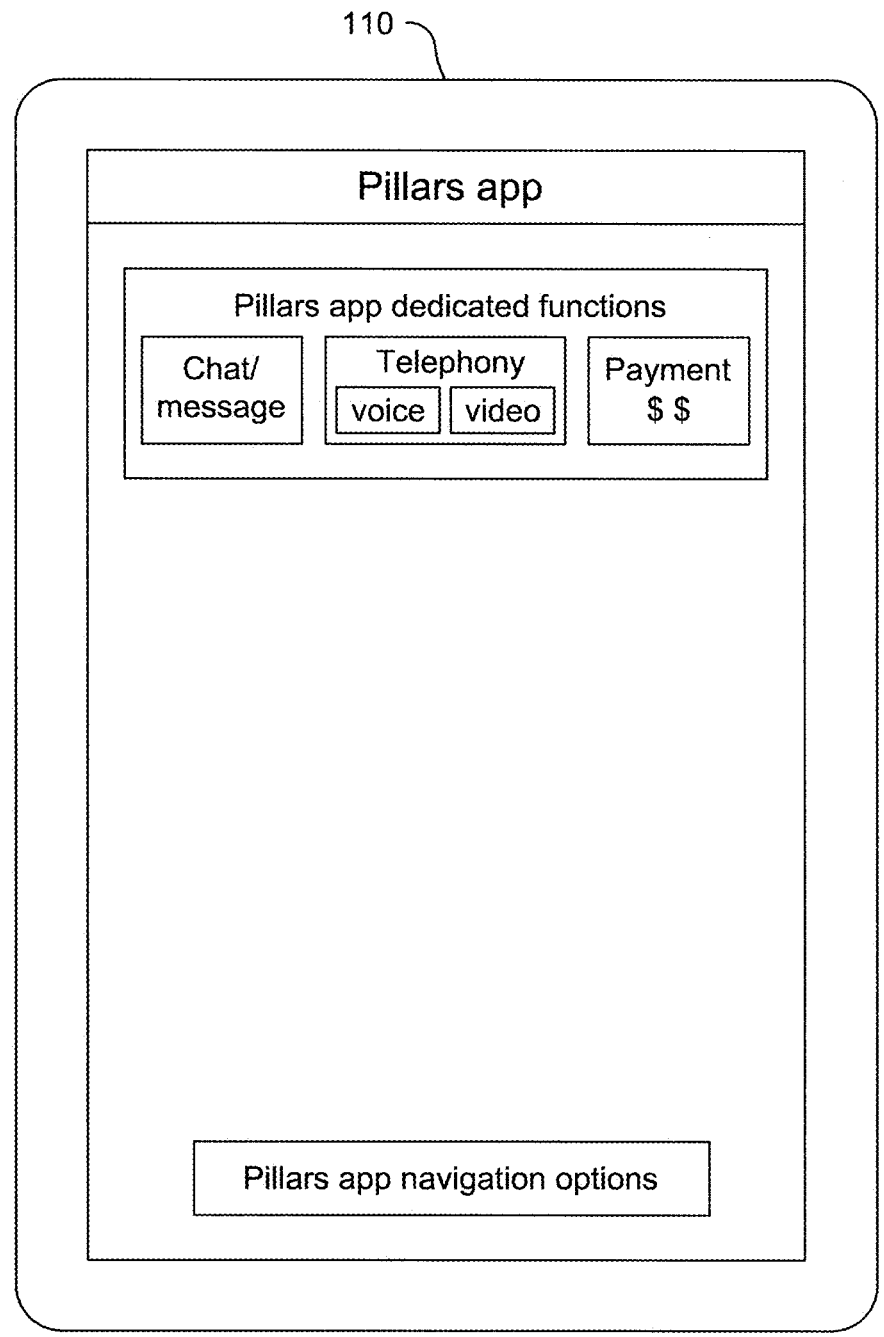

FIG. 4P shows a portion of a user interface display screen of the Pillars app 110 that may be used to launch any of these functionalities. In one preferred embodiment, these functionalities appear in a special portion of the Pillars app display screen labeled "Pillars app dedicated functions" so as to distinguish them from other functionalities of the Pillars app described above.

C. Use of Pillars/Subpillars with Storage/Cloud Storage Services

The Pillar-based organizational structure of Pillars and Subpillars may be integrated with cloud storage services. Some examples of such integration are as follows:

Amazon S3 (Simple Storage Service): Amazon S3 offers scalable and secure object storage. Media files can be uploaded to designated S3 buckets, with links and metadata associated with the relevant Pillars and Subpillars. This ensures that shared media is organized within the system's categorization framework.

Google Cloud Storage: Similar to Amazon S3, Google Cloud Storage provides reliable and scalable object storage. Media files can be stored in appropriate buckets, and metadata linking the media to relevant Pillars can be maintained for organizational purposes.

Microsoft Azure Blob Storage: Azure Blob Storage is well-suited for storing unstructured data such as media files. By associating metadata with the stored media, one can effectively link shared media to specific Pillars and Subpillars.

Dropbox API: Integration with the Dropbox API allows users to share media from their Dropbox accounts directly within the messaging module. Metadata and links can be used to connect the shared files to relevant Pillars.

D. Management of Media Content

The Pillar-based organizational structure of Pillars and Subpillars may be used for management of media content. Some examples of such management are as follows:

Media Categorization: When users share media, they can assign one or more Pillars/Subpillars to the shared content. This ensures that the shared media is associated with the appropriate categories, facilitating organized retrieval.

Contextual Sharing: Media files shared within conversations can be linked to specific Pillars and Subpillars, enhancing contextual communication. This allows users to access shared media within the relevant categories, improving data coherence.

Pillar-Specific Access: Access to shared media can be controlled based on the Pillars/Subpillars assigned to the content. Users who have access to specific Pillars can view and interact with the shared media linked to those categories.

Search and Retrieval: The integrated storage solution can be indexed and searchable based on Pillar metadata. This enables users to search for shared media within specific categories, streamlining data retrieval.

E. Pillar-Enhanced Online Payments

The Pillar concept may be used for various online payment functions, including the following functions:

Contextual Payments: Users can assign Pillars and Subpillars to online payments, ensuring transactions are organized within specific categories.

Financial Reports: Financial reports may be generated based on Pillar-assigned payments, providing clear insights into expenditure patterns.

Payment Reminders: Pillars can be linked to payment reminders, ensuring timely settlement of bills and invoices.

F. Cryptocurrency Portfolio Organization

The Pillar concept may be used for various cryptocurrency function, including the following functions:

Pillar-Categorized Portfolios: Users can categorize cryptocurrency holdings under specific Pillars, creating a structured approach to portfolio management.

Portfolio Analytics: Pillar-enhanced portfolios offer in-depth analytics, showcasing the performance of different crypto investments within designated categories.

Risk Management: Pillar-based segmentation aids in assessing risk exposure across various cryptocurrency holdings.

G. Chat Vs. Messaging

Chat is a form of messaging. Messaging is the transmission of text, images, audio, video, and other types of electronic messages between two or more people. Chat is a type of messaging that is typically real-time and interactive, meaning that messages are sent and received immediately, typically within a chat session. While chat and messaging are often used interchangeably to refer to the same type of communication, there are some subtle differences between the two terms. As noted above, chat is typically used to describe real-time, interactive communication, while messaging can also refer to asynchronous communication, where messages are sent and received at different times. Chat and messaging are interchangeably referred to herein as "messaging." Likewise, chat apps and messaging apps are interchangeably referred to herein as "messaging apps." Similarly, the platforms that these chat apps and messaging apps execute on are collectively referred to herein as "messaging platforms."

Peer-to-peer payment apps serve a primary function of a mobile payment service, but it does have some conventional messaging features. Some such apps even have chat (real-time messaging) features. Furthermore, a request to pay someone via such an app may be considered a "message" which typically has two parts, one being an instruction to a payment processor to transfer funds from the requester's (payor's) account to the recipient's (payee's) account, and another being a text message from the requester (payor) to the recipient (payee) that a payment was made. Accordingly, peer-to-peer payment apps are also interchangeably referred to herein as "messaging apps" executing on messaging platforms.

H. Pop Accounts Vs. Embodiments of Present Invention

As discussed above in the Examples, one feature of the present invention is that a user device may receive messages from Contacts in the same Pillars subcategory (e.g., Family/Children) that were sent from completely distinct platforms (e.g., WhatsApp, Instagram, iMessage, Facebook Messenger) and have them appear in a single location within the Pillars app, namely, the Children subpillar, where they can be responded to entirely within the Pillars app.

Consolidation of emails from different services may occur by using a POP email account. To do this, a user needs to forward their emails from the other services to the user's POP email account. In this manner, a user may forward their emails from one platform (e.g., Hotmail) to another email address on a completely different platform (e.g., Gmail), and thus access all of their emails from a single inbox, thereby avoiding the necessity to navigate to two separate platforms to view their messages.

POP email accounts differ from the present invention in multiple ways. First, the present invention relies upon API's of the platforms, not mail forwarding features, to perform its consolidation. The API's thus allow the sender's messages to be received directly from the messaging app platforms that the respective senders sent their messages from. Second, the present invention allows for categorization/subcategorization of Contacts such that messaging consolidation may be performed on a plurality of Contacts who belong to the same subcategory (Subpillar). No such functionality is available with POP accounts which operate only on individual email accounts.

I. Distinct Platforms

As used herein, "distinct platforms" are platforms which do not have any umbrella relationships with each other, such as by virtue of the same corporate ownership, or which do not share or consolidate message content among their platforms, even if they have the same corporate ownership. For example, if messaging is occurring between the same users on WhatsApp and Telegram, neither of these platforms would have any knowledge of the other's messaging, and thus these would be "distinct platforms." Similarly, even though WhatsApp and Facebook Messenger are both owned by Meta Platforms, Inc., the WhatsApp privacy policy states that it does not share the content of your messages with Facebook, and thus the WhatsApp and Facebook Messenger platforms can also be considered as being "distinct platforms."

J. Software Considerations

Preferred embodiments of the present invention can be included in an article of manufacture (e.g., one or more tangible computer program products) having, for instance, non-transitory computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s)/processor(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

Such computers/processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that conveys relationship between the fields. However, any suitable mechanism may be used to establish a relationship between information in fields of a data structure, including through the use of pointers, tags or other mechanisms that establish relationship between data elements.

The scope of the present invention thus further includes a tangible computer program product for messaging between a messaging application program installed on and executing on a device (Pillars app 110) and a plurality of messaging platforms 105 wherein the computer program product comprises non-transitory computer-readable media encoded with instructions for execution by a processor (including the processor that executes the YGO hub 111, 211, YGO software 114, 214, and the Pillars app 110, 210) to perform the methods described above.

K. YGO Acronym

"YGO" is an acronym for "You Go Organized." As described above, YGO is a chat app platform (which includes the Pillars app) that aims to revolutionize the chat management experience. With YGO, one can streamline and optimize a user's chat organization, allowing for enhanced productivity and efficiency in the user's daily tasks. By utilizing pillars, colors, and alarms, YGO empowers the user to categorize the user's chats effectively, thereby enabling the user to prioritize and manage time more efficiently.

It should be appreciated by those skilled in the art that various modifications and variations may be made to the present invention without departing from the scope and spirit of the invention. It is intended that the present invention include such modifications and variations as come within the scope of the present invention.

What is claimed is:

1. A computer program product for messaging between a messaging application program (messaging app) installed on and executing on a device associated with a user and a plurality of messaging platforms, the messaging app having a (i) a user interface display for interacting with the messaging app on the user's device, and (ii) a remote messaging app server which communicates with the messaging app, each of the messaging platforms having an application program interface (API) associated therewith, wherein a plurality of API's of the respective messaging platforms are installed in either the messaging app server or in the messaging app, and wherein the messaging app is configured to allow a plurality of the user's contacts to be stored in the messaging app, the computer program product comprising a computer readable medium tangibly embodying non-transitory computer-executable program instructions thereon that, when executed, cause one or more computing devices to:

(a) consolidate a plurality of messages sent by the same contact to the user of the messaging app from the plurality of different messaging platforms by using the API's of the respective messaging platforms, wherein the consolidated messages are stored in the messaging app;

(b) display the consolidated messages for the same contact via the user interface of the messaging app;

(c) receive via the user interface of the messaging app a request to respond to a message sent from a contact that was displayed in the messaging app; and (d) send a response message composed by the user via the messaging app to the messaging platform that the contact originally used by using the API of the messaging platform that the contact's message was originally received from, wherein the API automatically selects the API of the messaging platform without any user interaction.

2. The computer program product of claim 1 wherein the messaging app allows for a contact to be assigned to a specific category and subcategory, and wherein the message consolidation is performed on a plurality of contacts who belong to the same subcategory, and wherein the display of consolidated messages includes a display of all messages received from the plurality of contacts who belong to the same subcategory.

3. The computer program product of claim 1 wherein the plurality of API's of the respective messaging platforms are installed on, and execute on, the messaging app server.

4. The computer program product of claim 1 wherein the plurality of API's of the respective messaging platforms are installed on, and execute on, the messaging app.

5. The computer program product of claim 1 wherein the device is a smartphone.

6. An automated method for messaging between a messaging application program (messaging app) installed on and executing on a device associated with a user and a plurality of messaging platforms, the messaging app having a (i) a user interface display for interacting with the messaging app on the user's device, and (ii) a remote messaging app server which communicates with the messaging app, each of the messaging platforms having an application program interface (API) associated therewith, wherein a plurality of API's of the respective messaging platforms are installed in either the messaging app server or in the messaging app, and wherein the messaging app is configured to allow a plurality of the user's contacts to be stored in the messaging app, the method comprising:

(a) consolidating a plurality of messages sent by the same contact to the user of the messaging app from the plurality of different messaging platforms by using the API's of the respective messaging platforms, wherein the consolidated messages are stored in the messaging app;

(b) displaying the consolidated messages for the same contact via the user interface of the messaging app;

(c) receiving via the user interface of the messaging app a request to respond to a message sent from a contact that was displayed in the messaging app; and (d) sending a response message composed by the user via the messaging app to the messaging platform that the contact originally used by using the API of the messaging platform that the contact's message was originally received from, wherein the API automatically selects the API of the messaging platform without any user interaction.

7. The method of claim 6 wherein the messaging app allows for a contact to be assigned to a specific category and subcategory, and wherein the message consolidation is performed on a plurality of contacts who belong to the same subcategory, and wherein the display of consolidated messages includes a display of all messages received from the plurality of contacts who belong to the same subcategory.

8. The method of claim 6 wherein the plurality of API's of the respective messaging platforms are installed on, and execute on, the messaging app server.

9. The method of claim 6 wherein the plurality of API's of the respective messaging platforms are installed on, and execute on, the messaging app.

10. The method of claim 6 wherein the device is a smartphone.

11. A computer program product for messaging between a messaging application program (messaging app) installed on and executing on a device associated with a user and a plurality of messaging platforms, the messaging app having a (i) a user interface display for interacting with the messaging app on the user's device, and (ii) a remote messaging app server which communicates with the messaging app, each of the messaging platforms having an application program interface (API) associated therewith, wherein a plurality of API's of the respective messaging platforms are installed in either the messaging app server or in the messaging app, and wherein the messaging app is configured to allow a plurality of the user's contacts to be stored in the messaging app, the computer program product comprising a computer readable medium tangibly embodying non-transitory computer-executable program instructions thereon that, when executed, cause one or more computing devices to:

(a) consolidate a plurality of messages sent by the same contact to the user of the messaging app from the plurality of different messaging platforms by using the API's of the respective messaging platforms, wherein the consolidated messages are stored in the messaging app; and (b) display the consolidated messages for the same contact via the user interface of the messaging app, wherein the messaging app allows for a contact to be assigned to a specific category and subcategory, and wherein the message consolidation is performed on a plurality of contacts who belong to the same subcategory, and wherein the display of consolidated messages includes a display of all messages received from the plurality of contacts who belong to the same subcategory.

12. The computer program product of claim 11 wherein the computer-executable program instructions, when executed, further cause one or more computing devices to:

(c) receive via the user interface of the messaging app a request to respond to a message sent from a contact that was displayed in the messaging app; and (d) send a response message composed by the user via the messaging app to the messaging platform that the contact originally used by using the API of the messaging platform that the contact's message was originally received from, wherein the API automatically selects the API of the messaging platform without any user interaction.

13. The computer program product of claim 11 wherein the plurality of API's of the respective messaging platforms are installed on, and execute on, the messaging app server.

14. The computer program product of claim 11 wherein the plurality of API's of the respective messaging platforms are installed on, and execute on, the messaging app.

15. The computer program product of claim 11 wherein the device is a smartphone.

16. An automated method for messaging between a messaging application program (messaging app) installed on and executing on a device associated with a user and a plurality of messaging platforms, the messaging app having a (i) a user interface display for interacting with the messaging app on the user's device, and (ii) a remote messaging app server which communicates with the messaging app, each of the messaging platforms having an application program interface (API) associated therewith, wherein a plurality of API's of the respective messaging platforms are installed in either the messaging app server or in the messaging app, and wherein the messaging app is configured to allow a plurality of the user's contacts to be stored in the messaging app, the method comprising:

(a) consolidating a plurality of messages sent by the same contact to the user of the messaging app from the plurality of different messaging platforms by using the API's of the respective messaging platforms, wherein the consolidated messages are stored in the messaging app; and (b) displaying the consolidated messages for the same contact via the user interface of the messaging app, wherein the messaging app allows for a contact to be assigned to a specific category and subcategory, and wherein the message consolidation is performed on a plurality of contacts who belong to the same subcategory, and wherein the display of consolidated messages includes a display of all messages received from the plurality of contacts who belong to the same subcategory.

17. The method of claim 16 further comprising:

(c) receiving via the user interface of the messaging app a request to respond to a message sent from a contact that was displayed in the messaging app; and (e) sending a response message composed by the user via the messaging app to the messaging platform that the contact originally used by using the API of the messaging platform that the contact's message was originally received from, wherein the API automatically selects the API of the messaging platform without any user interaction.

18. The method of claim 16 wherein the plurality of API's of the respective messaging platforms are installed on, and execute on, the messaging app server.

19. The method of claim 16 wherein the plurality of API's of the respective messaging platforms are installed on, and execute on, the messaging app.

20. The method of claim 16 wherein the device is a smartphone.

* * * * *